US012786897B2

(12) United States Patent
Yu et al.

(10) Patent No.: US 12,786,897 B2
(45) Date of Patent: Nov. 3, 2026

(54) TRANSMIT POWER CONTROL FOR EXTENDED RESTRICTED WAKE TIME IN OVERLAPPING BASIC SERVICE SET ENVIRONMENTS

(71) Applicant: NEWRACOM, Inc., Irvine, CA (US)

(72) Inventors: Heejung Yu, Daejeon (KR); Joonsoo Lee, Seoul (KR); Si-Chan Noh, Seoul (KR)

(73) Assignee: NEWRACOM, Inc., Irvine, CA (US)

( * ) Notice: Subject to any disclaimer, the term of this patent is extended or adjusted under 35 U.S.C. 154(b) by 255 days.

(21) Appl. No.: 18/629,713

(22) Filed: Apr. 8, 2024

(65) Prior Publication Data

US 2024/0357517 A1 Oct. 24, 2024

Related U.S. Application Data

(60) Provisional application No. 63/497,973, filed on Apr. 24, 2023.

(51) Int. Cl.
*H04W 52/36* (2009.01)
*H04W 52/02* (2009.01)
*H04W 52/24* (2009.01)

(52) U.S. Cl.
CPC ..... *H04W 52/367* (2013.01); *H04W 52/0216* (2013.01); *H04W 52/242* (2013.01)

(58) Field of Classification Search
CPC ........... H04W 52/367; H04W 52/0216; H04W 52/242; H04W 52/262; H04W 84/12;
(Continued)

(56) References Cited

U.S. PATENT DOCUMENTS

2019/0014555 A1 1/2019 Vermani et al.
2022/0330149 A1* 10/2022 Hu ........................ H04L 1/1614
(Continued)

FOREIGN PATENT DOCUMENTS

TW I914484 B * 2/2026

OTHER PUBLICATIONS

IEEE P802.11ax/D8.0, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 1: Enhancements for High Efficiency WLAN", IEEE, Oct. 2020, 820 pages.
(Continued)

*Primary Examiner* — Fayyaz Alam
(74) *Attorney, Agent, or Firm* — Nicholson, De Vos, Webster & Elliott, LLP

(57) ABSTRACT

An over-restriction problem in extended restricted target wake time (rTWT) for overlapping basic service set (OBSS) networks is addressed by controlling the transmit power of OBSS packets during the rTWT service period (SP). This allows OBSS transmissions to occur concurrently with low latency traffic while minimizing interference. This approach mitigates the over-restriction problem and improves network efficiency. In one embodiment, a station in the OBSS can transmit data packets during the rTWT SP, if it has not received the beacon frame directly from the access point (AP) in the basic service set (BSS). In another embodiment, an AP in the OBSS provides extended rTWT metric information to help stations determine their maximum transmit power level during the rTWT SP. This enables stations to transmit data packets while minimizing interference to low latency transmissions in the BSS, thus mitigating the over-restriction problem.

20 Claims, 12 Drawing Sheets

(58) Field of Classification Search
CPC ........... H04W 52/241; H04W 52/0229; H04W 52/24; H04W 74/04; H04W 74/0816
See application file for complete search history.

(56) References Cited

U.S. PATENT DOCUMENTS

| | | | |
|---|---|---|---|
| 2022/0408355 A1 | 12/2022 | Shafin et al. | |
| 2023/0093547 A1 | 3/2023 | Park et al. | |
| 2024/0214996 A1 | 6/2024 | Shellhammer et al. | |
| 2024/0292325 A1* | 8/2024 | Haider | H04W 52/0216 |
| 2024/0298349 A1* | 9/2024 | Xia | H04W 8/22 |
| 2024/0340700 A1* | 10/2024 | Huq | H04W 28/0268 |
| 2025/0071813 A1* | 2/2025 | Ryu | H04L 5/0053 |

OTHER PUBLICATIONS

IEEE P802.11bd/D8.0, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 5: Enhancements for Next Generation V2X", IEEE, Oct. 2022, 148 pages.

IEEE P802.11be/D1.0, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 8: Enhancements for Extremely High Throughput (EHT)", IEEE, May 2021, 635 pages.

IEEE P802.11be/D5.1, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 2: Enhancements for Extremely High Throughput (EHT)", IEEE, Mar. 2024, 1051 pages.

IEEE Std 802.11-2016, "IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications", IEEE, Dec. 7, 2016, 3534 pages.

IEEE Std 802.11a-1999 (R2003), "Supplemental to IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—High-speed Physical Layer in the 5 GHz Band", IEEE, 1999 (Reaffirmed Jun. 12, 2003), 91 pages.

IEEE Std 802.11ac-2013, "IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", IEEE, Dec. 18, 2013, 425 pages.

IEEE Std 802.11b-1999 (R2003), "Supplemental to IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications: Higher-Speed Physical Layer Extension in the 2.4 GHz Band", IEEE, Sep. 16, 1999 (Reaffirmed Jun. 12, 2003), 96 pages.

IEEE Std 802.11g-2003, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 4: Further Higher Data Rate Extension in the 2.4 GHz Band", IEEE, Jun. 27, 2003, 78 pages.

IEEE Std 802.11n-2009, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 5: Enhancements for Higher Throughput", IEEE, Oct. 29, 2009, 536 pages.

IEEE Std 802.11p-2010, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 6: Wireless Access in Vehicular Environments", IEEE, Jul. 15, 2010, 51 pages.

Non-Final Office Action, U.S. Appl. No. 18/629,570, May 13, 2026, 10 pages.

Kiseon Ryu, "Restricted TWT SP Termination," IEEE Document No. 802.11-21/1358r0, IEEE 802.11 Working Group Contribution, Aug. 12, 2021, pp. 1-7.

Notice of Allowance, KR App. No. 10-2024-0053142, May 28, 2026, 22 pages (12 pageS of English Translation and 10 pages of Original Document).

* cited by examiner

| IEEE Standard | Max PHY rate | PHY rate enhancement | Bandwidth/number of spatial streams (SS) | Operating bands |
|---|---|---|---|---|
| 802.11b | 11 Mbps | | 22 MHz, 1 SS | 2.4 GHz |
| 802.11a/g | 54 Mbps | 5 X | 20 MHz, 1 SS | 5 GHz (.a)/2.4 GHz(.g) |
| 802.11n | 600 Mbps | 11 X | 40 MHz, 4 SS | 2.4/5 GHz |
| 802.11ac | 6.9 Gbps | 11 X | 160 MHz, 8 SS | 5 GHz |
| 802.11ax | 9.6 Gbps | 1.4 X | 160 MHz, 8 SS | 2.4/5 GHz |
| 802. 11be - Next Generation of 802.11 (EHT) | A Gbps | B X | 320 MHz, 16 SS | 2.4/5/6 GHz |

FIG. 6

| Element | Definition | Duration | DFT period | GI | Subcarrier spacing |
|---|---|---|---|---|---|
| Legacy(L)-STF | Non-high throughput(HT) Short Training field | 8 μs | - | - | equivalent to 1,250 kHz |
| L-LTF | Non-HT Long Training field | 8 μs | 3.2 μs | 1.6 μs | 312.5 kHz |
| L-SIG | Non-HT SIGNAL field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| U-SIG | Universal SIGNAL field | NUSIG *4 μs | 3.2 μs | 0.8 μs | 312.5 kHz |
| EHT-SIG | EHT SIGNAL field | NEHESIG * 4 μs | 3.2 μs | 0.8 μs | 312.5 kHz |
| EHT-HARQ | EHT HARQ field | TBD | TBD | TBD | TBD |
| EHT-STF | EHT Short Training field | TBD | TBD | TBD | TBD |
| EHT-LTF | EHT Long Training field | NEHTLTF * (DTF period + GI) μs | • 2xLTF: 6.4 μs<br>• 4xLTF: 12.8 μs | supports 0.8, 1.6, 3.2 μs | • 2xLTF: (equivalent to) 156.25 kHz;<br>• 4xLTF: 78.125 kHz |
| EHT-DATA | EHT DATA field | NDATA * (DTF period + GI) μs | 12.8 μs | supports 0.8, 1.6, 3.2 μs | 78.125 kHz |
| EHG-MA | EHT Midamble field | TBD | TBD | TBD | TBD |

FIG. 7

TRANSMIT POWER CONTROL FOR EXTENDED RESTRICTED WAKE TIME IN OVERLAPPING BASIC SERVICE SET ENVIRONMENTS

CROSS-REFERENCE TO RELATED APPLICATION

This application claims the benefit of U.S. Provisional Application No. 63/497,973 filed Apr. 24, 2023, which is hereby incorporated by reference.

TECHNICAL FIELD

The present disclosure generally relates to wireless communications, and more specifically, relates to transmit power control for extended restricted wake time in overlapping basic service set environments.

BACKGROUND

Institute of Electrical and Electronics Engineers (IEEE) 802.11 is a set of standards for implementing wireless local area network communication in various frequencies, including but not limited to the 2.4 gigahertz (GHz), 5 GHZ, 6 GHZ, and 60 GHz bands. These standards define the protocols that enable Wi-Fi devices to communicate with each other. The 802.11 family of standards has evolved over time to accommodate higher data rates, improved security, and better performance in different environments. Some of the most widely used standards include 802.11a, 802.11b, 802.11g, 802.11n, 802.11ac, and the latest 802.11ax (also known as "Wi-Fi 6"). These standards specify the modulation techniques, channel bandwidths, and other technical aspects that ensure interoperability between devices from various manufacturers. IEEE 802.11 has played an important role in the widespread adoption of wireless networking in homes, offices, and public spaces, enabling users to connect their devices to the internet and each other without the need for wired connections.

IEEE 802.11be, also known as "Wi-Fi 7", is the next generation of the IEEE 802.11 family of standards for wireless local area networks. Currently under development, 802.11be aims to significantly improve upon the capabilities of its predecessor, 802.11ax/Wi-Fi 6, by offering even higher data rates, lower latency, and increased reliability. The standard is expected to leverage advanced technologies such as multi-link operation (MLO), which allows devices to simultaneously use multiple frequency bands and channels for enhanced performance and reliability. Additionally, 802.11be will introduce 4096-QAM (Quadrature Amplitude Modulation), enabling higher data rates by encoding more bits per symbol. The standard will also feature improved medium access control (MAC) efficiency, enhanced power saving capabilities, and better support for high-density environments. With these advancements, 802.11be is expected to deliver theoretical maximum data rates of up to 46 gigabits per second (Gbps), making it suitable for bandwidth-intensive applications such as virtual and augmented reality, 8K video streaming, and high-performance gaming. The IEEE 802.11be standard is projected to be finalized by the end of 2024, paving the way for the next generation of Wi-Fi devices and networks.

Restricted target wake time (rTWT) is a mechanism proposed in the IEEE 802.11be standard to support low latency traffic delivery. In rTWT, specific time windows are allocated for low latency transmissions, ensuring that these critical packets are delivered with minimal delay. However, in overlapped basic service set (OBSS) networks, where multiple access points (APs) have overlapping coverage areas, transmissions from neighboring BSSs can interfere with the low latency packets. To address this issue, the concept of extended rTWT has been introduced, where the rTWT mechanism is applied not only within a single BSS but also coordinated with neighboring BSSs.

While the extended rTWT aims to mitigate interference and ensure low latency delivery across multiple BSSs, it can lead to an over-restriction problem. When rTWT is extended to neighboring BSSs, it may impose unnecessary restrictions on the transmissions of other devices in those BSSs, even if they do not have low latency requirements. This over-restriction can result in reduced overall network efficiency and capacity, as some devices may be prevented from transmitting during the rTWT windows, even when they do not interfere with the low latency traffic.

BRIEF DESCRIPTION OF THE DRAWINGS

The disclosure will be more fully understood from the detailed description provided below and the accompanying drawings that depict various embodiments of the disclosure. However, these drawings should not be interpreted as limiting the disclosure to the specific embodiments shown; they are provided for explanation and understanding only.

FIG. 6 is a table of various characteristics of several wireless networking standards, in accordance with some embodiments of the present disclosure.

FIG. 7 is a table of various fields of an extremely high throughput physical protocol data unit frame, in accordance with some embodiments of the present disclosure.

DETAILED DESCRIPTION

Figure 1:
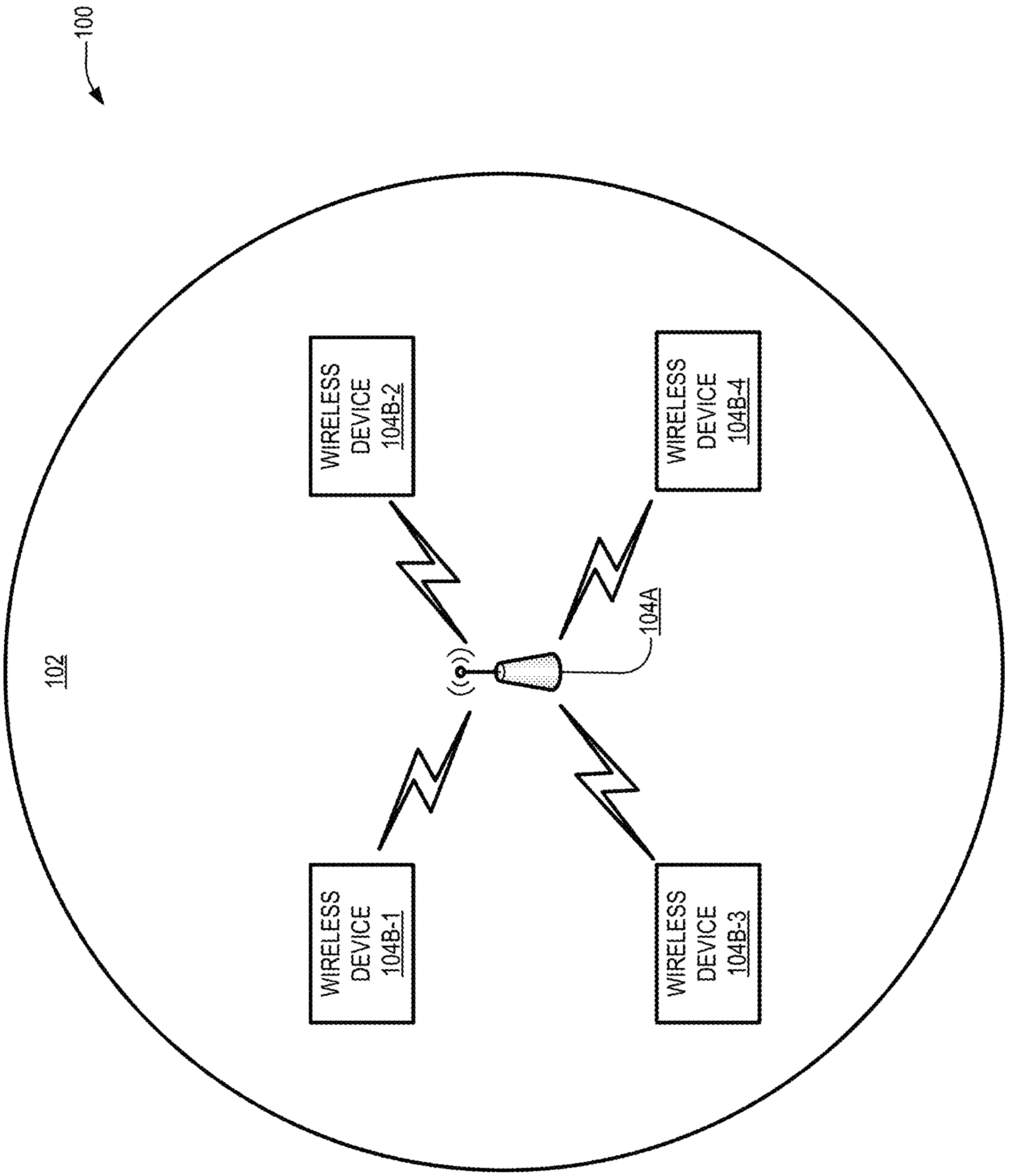
FIG. 1 illustrates an example of a wireless local area network with a basic service set that includes multiple wireless devices, in accordance with some embodiments of the present disclosure.

The present disclosure generally relates to wireless communications, and more specifically, relates to transmit power control for extended restricted wake time in overlapping basic service set environments.

Disclosed is a solution to the over-restriction problem in extended rTWT for OBSS networks. The solution is to control the transmit power of OBSS packets during the rTWT service period (SP). By limiting the transmit power of devices in neighboring BSSs during the rTWT SP, the solution allows for OBSS transmissions to occur concurrently with the low latency traffic, while ensuring that the interference to the low latency packets is minimized. This approach strikes a balance between protecting the low latency transmissions and enabling other devices in the OBSS to transmit data, thereby improving the overall spectral efficiency of the network.

The technical benefits of the disclosed solution are twofold. First, by allowing OBSS transmissions during the rTWT SP, the solution mitigates the over-restriction problem that arises when rTWT is extended to neighboring BSSs. Devices in the OBSS that do not have low latency requirements can still transmit data during the rTWT SP, thus enhancing the overall network capacity and reducing the impact of over-restriction on network performance. Second, the controlled transmit power of OBSS packets ensures that the interference to the low latency traffic is kept within acceptable limits. By carefully adjusting the transmit power, the solution maintains the integrity of the low latency transmissions while simultaneously allowing other devices to access the channel.

An embodiment of the solution to the over-restriction problem in extended rTWT for OBSS networks encompasses a wireless device functioning as a station in an overlapping basic service set (OBSS) that receives a first beacon frame from an access point (AP) in the OBSS. The first beacon frame contains extended restricted target wake time (rTWT) information, which indicates an rTWT service period. This extended rTWT information is based on the rTWT information included in a second beacon frame that the AP in the OBSS received from an AP in the basic service set (BSS). The second beacon frame is sent by the AP in the BSS to facilitate a low latency transmission from a station within the BSS during the rTWT service period.

An aspect of this embodiment is that when the station in the OBSS does not receive the second beacon frame directly from the AP in the BSS, it can still wirelessly transmit a data packet during the rTWT service period to facilitate the low latency transmission from the station in the BSS. This approach allows the station in the OBSS to support the low latency transmission in the BSS without being overly restricted by the extended rTWT information.

By enabling the station in the OBSS to transmit data packets during the rTWT service period, even when it has not directly received the second beacon frame from the AP in the BSS, this embodiment mitigates the over-restriction problem. It allows stations in the OBSS to participate in facilitating low latency transmissions in the BSS while still maintaining the flexibility to transmit their own data packets, thus improving overall network efficiency and capacity.

Another embodiment of the solution to the over-restriction problem in extended rTWT for OBSS networks encompasses a wireless device functioning as an access point (AP) in an overlapping basic service set (OBSS) that receives a first beacon frame from an AP in the basic service set (BSS). The first beacon frame contains restricted target wake time (rTWT) information.

Based on the rTWT information in the first beacon frame, the AP in the OBSS determines extended rTWT information that indicates an rTWT service period. The AP then generates a second beacon frame that includes this extended rTWT information. Additionally, the second beacon frame contains extended rTWT metric information, which is designed to help a station in the OBSS determine the maximum transmit power level for a data packet that the station transmits during the rTWT service period.

The AP in the OBSS wirelessly transmits the second beacon frame to the station in the OBSS. The purpose of this transmission is to facilitate the station's determination of the maximum transmit power level for its data packet during the rTWT service period.

By providing the extended rTWT metric information in the second beacon frame, this embodiment enables the station in the OBSS to adjust its transmit power level accordingly during the rTWT service period. This approach allows the station to transmit data packets while minimizing interference to the low latency transmissions in the BSS. By controlling the transmit power level, the embodiment mitigates the over-restriction problem, as the station in the OBSS can still transmit data packets during the rTWT service period.

For sake of illustration, various embodiments are primarily described herein in the context of wireless networks based on Institute of Electrical and Electronics Engineers (IEEE) 802.11 standards using terminology thereof. However, embodiments are not limited thereto. Those skilled in the relevant art will appreciate that the techniques disclosed herein can be used in other types of wireless networks.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 depicts a wireless local area network 100 (WLAN 100) with a basic service set (BSS) 102. The BSS 102 comprises multiple wireless devices 104 (also known as WLAN devices 104). Each wireless device 104 is equipped with a medium access control (MAC) layer and a physical (PHY) layer, conforming to the IEEE 802.11 standard, which may include any of its amendments (e.g., 802.11a/b/g/n/p/ac/ax/bd/be).

In one embodiment, the medium access control (MAC) layer of a wireless device 104 can initiate the transmission of a frame to another wireless device 104 by passing a PHY-TXSTART.request (TXVECTOR) to the physical (PHY) layer. The TXVECTOR specifies parameters for generating and/or transmitting the corresponding frame. Likewise, the PHY layer of a receiving wireless device can generate an RXVECTOR, which includes parameters of the received frame, and pass it to the MAC layer for processing.

The group of wireless devices 104 may include a wireless device 104A that serves as an access point, sometimes referred to as an "access point station" or "AP STA," and other wireless devices 104B1-104B4 that function as non-access point stations, often called "non-AP STAs."

Alternatively, in an ad-hoc networking environment, all devices in the group, 104, might be non-access point stations. Typically, both the access point station (e.g., wireless device 104A) and the non-access point stations (e.g., wireless devices 104B1-104B4) are collectively considered stations. However, for simplicity in this description, the term stations may sometimes only refer to non-access point stations. While this example shows four non-access point stations (wireless devices 104B1-104B4), the wireless local area network (WLAN) 100 can accommodate any number of non-access point stations (e.g., one or more wireless devices 104B).

Figure 2:
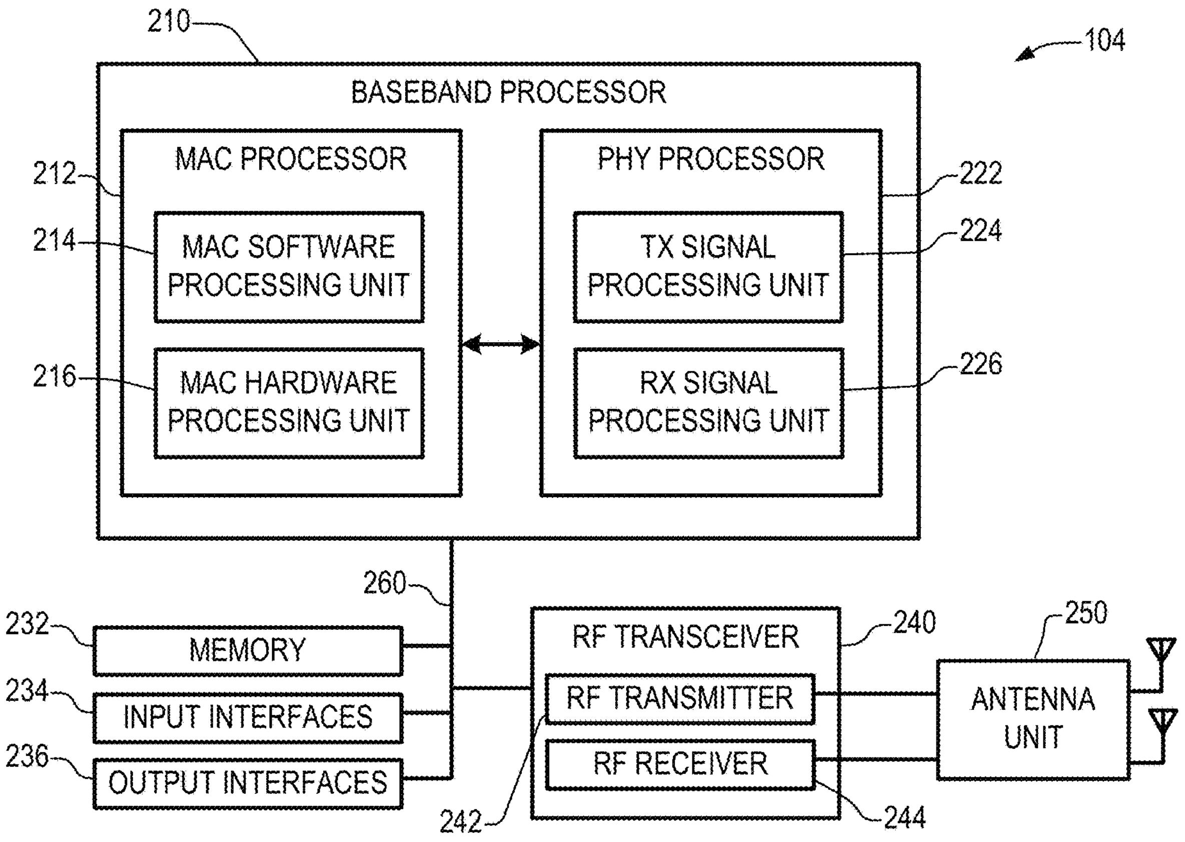
FIG. 2 is a schematic diagram of a wireless device, in accordance with some embodiments of the present disclosure.

FIG. 2 presents a schematic block diagram of a wireless device 104, according to an embodiment. This wireless device 104 could be either the wireless device 104A (e.g., the access point of wireless local area network (WLAN) 100) or any of the wireless devices 104B1-104B4 depicted in FIG. 1. The wireless device 104 comprises a baseband processor 210, a radio frequency (RF) transceiver 240 (RF transceiver 240), an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 are interconnected via a bus 260.

The baseband processor 210 is responsible for baseband signal processing and encompasses a medium access control (MAC) processor 212 (MAC processor 212) and a physical (PHY) processor 222 (PHY processor 222). It may access memory 232, which can be a non-transitory computer-readable medium containing software (e.g., programming instructions) and data.

In an embodiment, the MAC processor 212 comprises a MAC software processing unit 214 and a MAC hardware processing unit 216. The MAC software processing unit 214 executes MAC software to perform a first set of functions of the MAC layer, which can be part of the software stored in storage device 232. Conversely, the MAC hardware processing unit 216 realizes a second set of MAC layer functions through specialized hardware. However, the configuration of the MAC processor 212 is not limited to these arrangements. For instance, it may be designed to execute both sets of functions entirely in software or hardware, depending on the specific implementation.

The PHY processor 222 comprises a transmitting (TX) signal processing unit (SPU) 224 (TxSPU 224) and a receiving (RX) SPU 226 (RxSPU 226). It executes a variety of functions associated with the physical (PHY) layer, which can be carried out in software, hardware, or a mix of both, depending on the implementation.

Functions performed by the TxSPU 224 may include, but are not limited to, forward error correction (FEC) encoding, parsing streams into one or more spatial streams, diversity encoding of these spatial streams into a multitude of space-time streams, spatial mapping of space-time streams to transmit chains, inverse Fourier transform computation, and cyclic prefix insertion to establish a guard interval. Conversely, the RxSPU 226 may handle functions that are essentially the inverses of those performed by the TxSPU 224, such as guard interval removal, Fourier transform computation, among others.

The RF transceiver 240 comprises an RF transmitter 242 and an RF receiver 244. It is designed to transmit information (referred to as first information) received from the baseband processor 210 to the wireless local area network (WLAN) 100 (for example, to another wireless device 104 within the WLAN 100) and to relay information (referred to as second information) received from the WLAN 100 (for example, from another wireless device 104 of the WLAN 100) back to the baseband processor 210.

The antenna unit 250 comprises one or more antennas. For applications utilizing multiple-input, multiple-output (MIMO) or multi-user multiple-input, multiple-output (MU-MIMO), the antenna unit 250 may feature a plurality of antennas. In certain embodiments, these antennas can function as part of a beamforming array. Additionally, the antennas within the antenna unit 250 can be either directional, with options for fixed or steerable orientations.

Input interfaces 234 receive information from a user, while the output interfaces 236 convey information to the user. The input interfaces 234 may consist of one or more of the following: a keyboard, keypad, mouse, touchscreen, microphone, among others. Similarly, the output interfaces 236 may include one or more of the following: a display device, touchscreen, speaker, among others.

As outlined in this document, numerous functions of the wireless local area network (WLAN) device 104 can be realized through either hardware or software. The decision to implement certain functions in software and others in hardware is influenced by various design constraints. These constraints may encompass aspects such as design and manufacturing costs, time-to-market objectives, power consumption considerations, and the availability of semiconductor technology, among others.

As described herein, a wide variety of electronic devices, circuits, firmware, software, and combinations thereof may be used to implement the functions of the components of the wireless local area network (WLAN) device 104. Furthermore, the WLAN device 104 may include other components, such as application processors, storage interfaces, clock generator circuits, power supply circuits, and the like, which have been omitted in the interest of brevity.

Figure 3A:
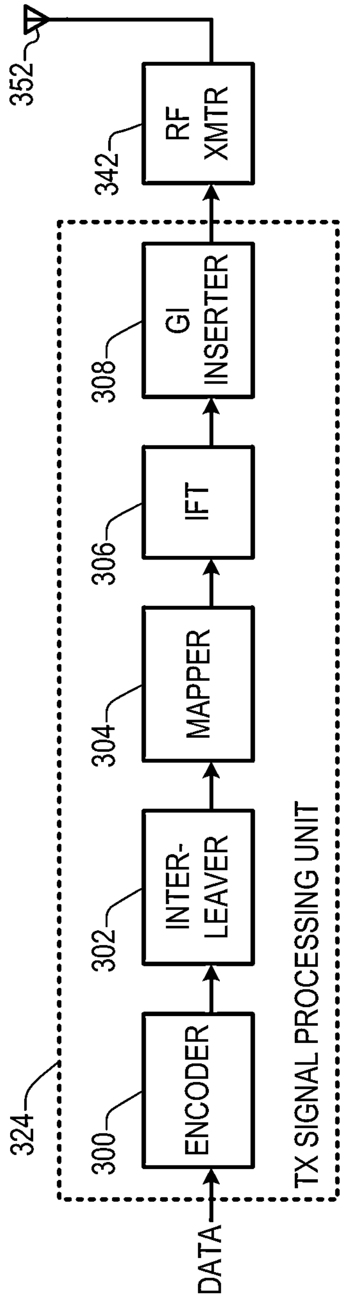
FIG. 3A illustrates components of a wireless device configured to transmit data, in accordance with some embodiments of the present disclosure.

FIG. 3A illustrates components of a wireless local area network (WLAN) device 104 configured to transmit data according to an embodiment, including a transmitting (TX) signal processing unit (SPU) 324 (TxSPU 324), a radio frequency (RF) transmitter 342 (RF transmitter 342), and an antenna 352. In an embodiment, the TxSPU 324, the RF transmitter 342, and the antenna 352 correspond to the TxSPU 224, the RF transmitter 242, and an antenna of the antenna unit 250 of FIG. 2, respectively.

The TxSPU 324 comprises an encoder 300, an interleaver 302, a mapper 304, an inverse Fourier transformer 306, and a guard interval inserter 308.

Encoder 300 receives input data and encodes it. In one embodiment, the encoder 300 features a forward error correction (FEC) encoder, which may consist of a binary convolutional code encoder followed by a puncturing device. Alternatively, the FEC encoder may utilize a low-density parity-check encoder.

The TxSP 324 may also incorporate a scrambler to scramble the input data before encoding by the encoder 300, aiming to minimize the likelihood of prolonged sequences of 0s or 1s. When binary convolutional code encoding is executed by the encoder 300, the TxSP 324 might include an encoder parser to demultiplex the scrambled bits across multiple binary convolutional code encoders. However, if the encoder utilizes low-density parity-check encoding, the TxSP 324 may forego the use of the encoder parser.

The interleaver 302 interleaves the bits of each stream output from the encoder 300, altering their order. The interleaver 302 applies interleaving specifically when the encoder 300 performs binary convolutional code encoding. In cases where binary convolutional code encoding is not used, it may pass the stream output from the encoder 300 without modifying the bit order.

Mapper 304 converts the sequence of bits output from the interleaver 302 into constellation points. When the encoder 300 uses low-density parity-check encoding, the mapper 304 may additionally execute low-density parity-check tone mapping, alongside constellation mapping.

When the TxSP 324 is engaged in multiple-input, multiple-output (MIMO) or multi-user multiple-input, multiple-output (MU-MIMO) transmissions, it may incorporate multiple interleavers 302 and mappers 304, corresponding to the number of spatial streams involved in the transmission. Additionally, the TxSP 324 might feature a stream parser to segment the encoder 300's output into blocks, which are then distributed to different interleavers 302 or mappers 304. It may also include a space-time block code encoder to disperse the constellation points across the spatial streams into a set number of space-time streams, and a spatial mapper tasked with assigning these space-time streams to transmit chains. This spatial mapper could employ strategies such as direct mapping, spatial expansion, or beamforming for optimal transmission.

The inverse Fourier transform 306 transforms a block of constellation points, received from the mapper 304 or, in cases of multiple-input, multiple-output (MIMO) or multi-user multiple-input, multiple-output (MU-MIMO), the spatial mapper, into a time domain block (e.g., a symbol) through an inverse discrete Fourier transform or an inverse fast Fourier transform. When employing the space-time block code encoder and the spatial mapper, a dedicated inverse Fourier transform 306 may be provided for each transmit chain.

When conducting a multiple-input, multiple-output (MIMO) or multi-user multiple-input, multiple-output (MU-MIMO) transmission, the TxSP 324 may incorporate cyclic shift diversities to avert unintended beamforming. The cyclic shift diversities insertion can occur either before or after the inverse Fourier transform 306 process. It can be applied specifically for each transmit chain or for each space-time stream. Alternatively, cyclic shift diversities may be integrated as part of the spatial mapping process.

In multiple-input, multiple-output (MIMO) or multi-user multiple-input, multiple-output (MU-MIMO) transmissions conducted by the TxSP 324, specific blocks preceding the spatial mapper are allocated individually for each user.

The guard interval inserter 308 appends a guard interval to the beginning of each symbol output by the inverse Fourier transform 306. This guard interval typically comprises a cyclic prefix, which is a duplicate of the symbol's concluding segment, placed before the symbol to mitigate interference. Optionally, the TxSP 324 can apply windowing to each symbol post-guard interval insertion to smooth out the symbol edges.

The RF transmitter 342 converts the baseband symbols into a radio frequency (RF) signal and then transmits this RF signal through antenna 352. In cases where the TxSP 324 supports multiple-input, multiple-output (MIMO) or multi-user multiple-input, multiple-output (MU-MIMO) transmissions, both the guard interval inserter 308 and the RF transmitter 342 are configured for each individual transmit chain.

Figure 3B:
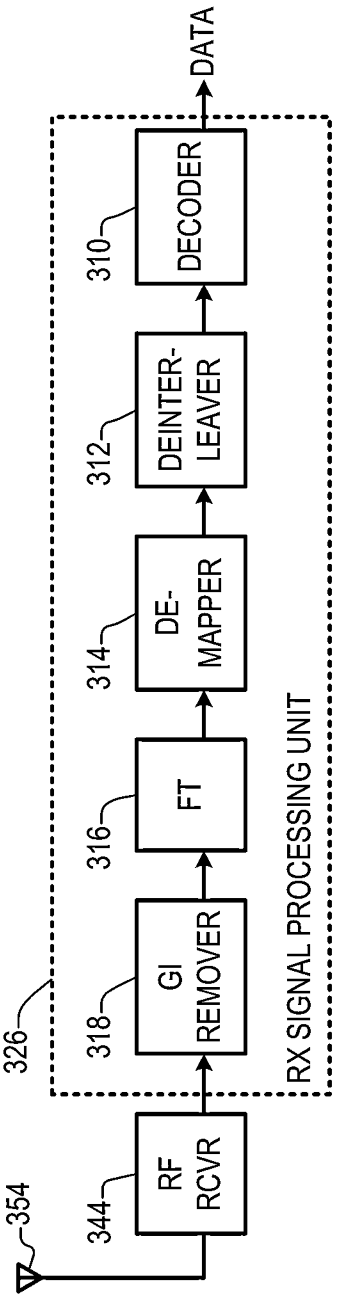
FIG. 3B illustrates components of a wireless device configured to receive data, in accordance with some embodiments of the present disclosure.

FIG. 3B illustrates components of a wireless local area network (WLAN) device 104 configured to receive data, including a receiver signal processing unit 326 (RxSPU 326), a radio frequency (RF) receiver 344 (RF receiver 344), and an antenna 354. In this embodiment, the RxSPU 326, RF receiver 344, and antenna 354 correspond to the receiving SPU 226, the RF receiver 244, and one of the antennas in the antenna unit 250 of FIG. 2, respectively.

The RxSPU 326 includes a guard interval remover 318, a Fourier transformer 316 (FT 316), a demapper 314, a deinterleaver 312, and a decoder 310.

The RF receiver 344 receives a radio frequency (RF) signal via the antenna 354 and converts the RF signal into symbols. The guard interval remover 318 then removes the guard interval from each symbol. When the received transmission employs multiple-input, multiple-output (MIMO) or multi-user multiple-input, multiple-output (MU-MIMO) technology, the RF receiver 344 and the guard interval remover 318 may be allocated for each receive chain.

The FT 316 converts each symbol (e.g., each time domain block) into a frequency domain block of constellation points using either a discrete Fourier transform (DFT) or a fast Fourier transform (FFT). FT 316 may be allocated for each receive chain.

When the received transmission is a multiple-input, multiple-output (MIMO) or multi-user multiple-input, multiple-output (MU-MIMO) transmission, the RxSP 326 may include a spatial demapper that converts the outputs of the FTs 316 from the receiver chains into constellation points of multiple space-time streams. Additionally, a space-time block code decoder may be employed for despreading the constellation points from the space-time streams into one or more spatial streams.

The demapper 314 demaps the constellation points output from the FT 316 or the space-time block code decoder to bit streams. If the received transmission was encoded using low-density parity-check encoding, demapper 314 may further perform low-density parity-check tone demapping before performing the constellation demapping.

The deinterleaver 312 deinterleaves the bits of each stream output from the demapper 314. It performs deinterleaving specifically when the received transmission was encoded with binary convolutional code encoding. Otherwise, it may pass the stream from demapper 314 without any deinterleaving.

When the received transmission employs multiple-input, multiple-output (MIMO) or multi-user multiple-input, multiple-output (MU-MIMO) technology, the RxSP 326 may incorporate multiple demappers 314 and deinterleavers 312, matching the number of spatial streams in the transmission. In such scenarios, the RxSP 326 may also include a stream deparser for aggregating the outputs from the deinterleavers 312.

The decoder 310 processes the streams emanating from either deinterleaver 312 or the stream deparser. In a specific embodiment, the decoder 310 is equipped with a forward error correction (FEC) decoder. This FEC decoder can be configured as either a binary convolutional code decoder or a low-density parity-check decoder.

The RxSP 326 might also incorporate a descrambler to revert the decoding process on the decoded data. If binary convolutional code decoding is executed by decoder 310, the RxSP 326 could additionally employ an encoder deparser for aggregating the data decoded by multiple binary convolutional code decoders. Conversely, if low-density parity-check decoding is carried out by decoder 310, the use of the encoder deparser may not be necessary.

Before initiating a transmission, wireless devices, including wireless device 104, assess the availability of the wireless medium through clear channel assessment (CCA). CCA determines the medium as busy if it is occupied, and idle if it is available.

The physical (PHY) entity of Institute of Electrical and Electronics Engineers (IEEE) 802.11 is based on Orthogonal Frequency Division Multiplexing (OFDM) or Orthogonal Frequency Division Multiple Access (OFDMA). In both OFDM and OFDMA Physical (PHY) layers, a station, such as wireless device 104, can transmit and receive PHY Protocol Data Units (PPDUs) in accordance with the mandatory PHY specifications. These specifications define a set of Modulation and Coding Schemes (MCS) and the maximum number of spatial streams. Certain PHY entities also specify downlink (DL) and uplink (UL) Multi-User (MU) transmissions, detailing a maximum number of space-time streams (STS) per user and a total number of STSs. PHY entities may support channel widths of 10 MHZ, 20 MHz, 40 MHz, 80 MHz, 160 MHz, 240 MHz, and 320 MHz for contiguous channels, as well as 80+80, 80+160 MHz, and 160+160 MHz for non-contiguous channels. Each channel comprises multiple subcarriers, also known as tones. PHY entities define signaling fields within a PPDU, such as Legacy Signal (L-SIG), Signal A (SIG-A), and Signal B (SIG-B), to communicate essential information about PHY Service Data Unit (PSDU) attributes. For clarity and conciseness, the descriptions that follow will focus on OFDM-based 802.11 technology, referring to a station as a non-access point station unless specified otherwise.

Figure 4:
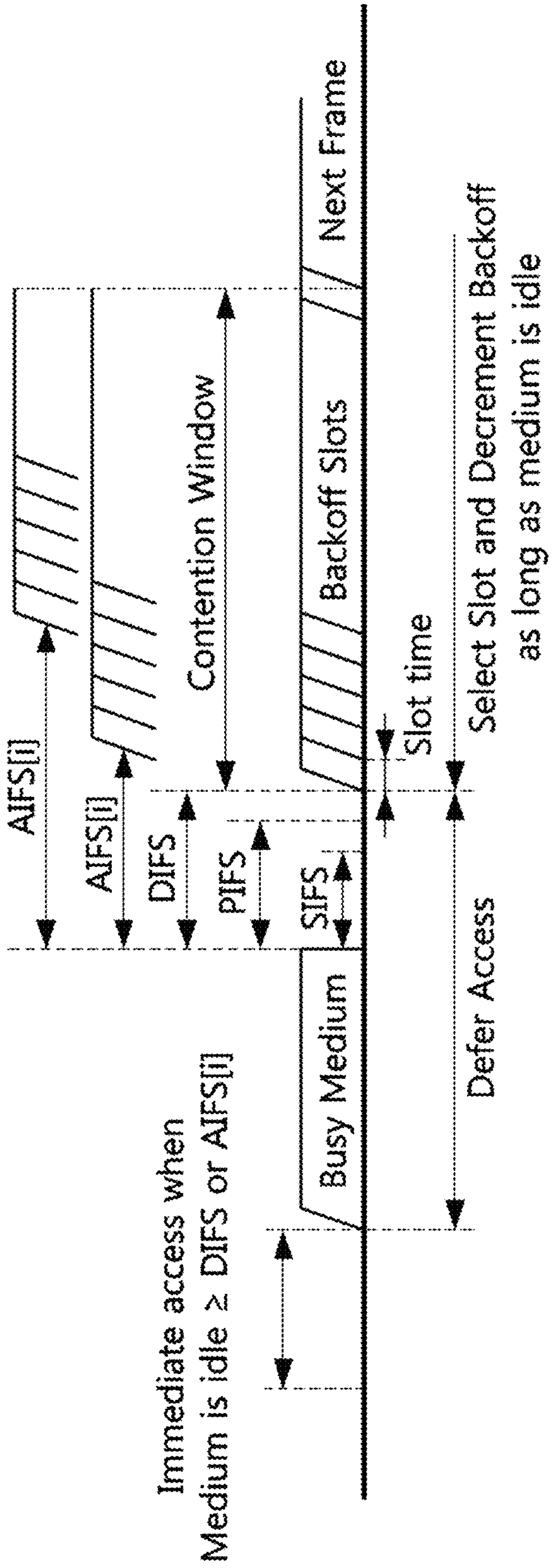
FIG. 4 illustrates inter-frame space relationships, in accordance with some embodiments of the present disclosure.

FIG. 4 illustrates the relationships among Inter-Frame Spaces (IFSs), showcasing a Short IFS (SIFS), a Point Coordination Function IFS (PIFS), a Distributed Coordination Function IFS (DIFS), and an Arbitration IFS (AIFS) for Access Category 'i' (AIFS [i]). Additionally, the figure depicts a slot time and the transmission of a data frame, which is forwarded to a higher layer for processing. As illustrated, a wireless local area network (WLAN) device 104 initiates the transmission of the data frame following a backoff period, provided that a DIFS duration has passed with the medium remaining idle.

Management frames are utilized to exchange management information, which is not forwarded to higher layers. The subtypes of management frames include beacon frames, association request/response frames, probe request/response frames, and authentication request/response frames.

Control frames are employed to manage access to the medium. The subtypes of control frames encompass Request to Send (RTS), Clear to Send (CTS), and Acknowledgement (ACK) frames.

When the control frame does not serve as a response to another frame, wireless local area network (WLAN) device 104 transmits the control frame after initiating a backoff procedure, provided a DIFS (Distributed Coordination Function Inter-Frame Space) period has passed with the medium being idle. Conversely, if the control frame is a response to another frame, WLAN device 104 transmits the control frame following a SIFS (Short Inter-Frame Space) period, without performing a backoff or assessing the medium's idle status.

A wireless local area network (WLAN) device 104 equipped with quality of service (QoS) capabilities (sometimes referred to as a "QoS STA") may initiate frame transmission after a backoff period, provided that the Arbitration Inter-Frame Space (AIFS) corresponding to the access category (AC) associated with the frame (i.e., AIFS [AC]) has elapsed. For transmissions by a QOS STA, data frames, management frames, and control frames (excluding response frames) can utilize the AIFS [AC] designated for the AC of the frame being transmitted.

A wireless local area network (WLAN) device 104 may initiate a backoff procedure upon finding the medium occupied when it is prepared to transmit a frame. This procedure entails calculating a random backoff duration consisting of N backoff slots, with each slot corresponding to a predefined slot time and N representing an integer greater than or equal to zero. The selection of the backoff period is influenced by the size of the Contention Window (CW). Furthermore, the backoff duration can be adjusted based on the Access Category (AC) of the frame in question. The commencement of all backoff slots follows either a Distributed Coordination Function Inter-Frame Space (DIFS) or an Extended Inter-Frame Space (EIFS), during which the medium must be observed as idle for the entirety of the interval.

When the wireless local area network (WLAN) device 104 observes no activity on the medium for the length of a designated backoff slot, the backoff procedure mandates reducing the backoff time by one slot time. Should the WLAN device 104 find the medium occupied during a backoff slot, the backoff process is paused and resumes only after the medium is perceived as idle for a complete Distributed Coordination Function Inter-Frame Space (DIFS) or Extended Inter-Frame Space (EIFS) interval. The device is then authorized to initiate the transmission or retransmission of the frame once the backoff timer counts down to zero.

The backoff procedure functions such that when multiple wireless local area network (WLAN) devices 104 defer and initiate the backoff process, each device selects a backoff time through a random function. The device with the shortest backoff time gains priority in the contention, thereby minimizing the likelihood of a collision.

Figure 5:
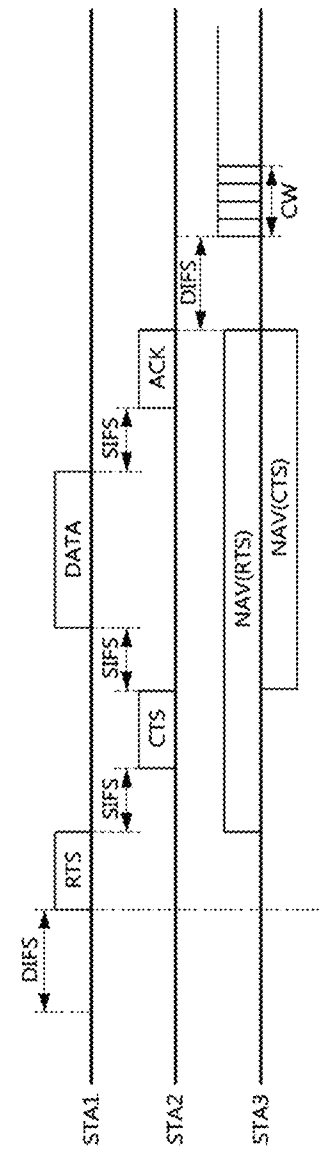
FIG. 5 illustrates a carrier sense multiple access/collision avoidance-based frame transmission procedure, in accordance with some embodiments of the present disclosure.

FIG. 5 illustrates a Carrier Sense Multiple Access with Collision Avoidance (CSMA/CA)-based frame transmission procedure designed to prevent collisions among frames on a channel, according to an embodiment. It depicts a first station (STA1) transmitting data, a second station (STA2) receiving the data, and a third station (STA3) situated in an area where it can receive a frame from either STA1, STA2, or both. Stations STA1, STA2, and STA3 may represent WLAN devices 104 as shown in FIG. 1.

The station STA1 may assess whether the channel is occupied by performing carrier sensing. It can determine the channel's status based on the energy level present in the channel, the autocorrelation of signals within the channel, or by utilizing a Network Allocation Vector (NAV) timer to ascertain channel occupation.

After determining that the channel is not occupied by other devices (i.e., the channel is IDLE) during a DIFS (and performing backoff, if required), the station STA1 may transmit a Request-To-Send (RTS) frame to station STA2. Upon receiving the RTS frame, after a SIFS, station STA2 may transmit a Clear-To-Send (CTS) frame in response. If Dual-CTS is enabled and station STA2 is an access point, the access point may issue two CTS frames in response to the RTS frame—for example, a first CTS frame in a non-High Throughput (non-HT) format and a second CTS frame in the High Throughput (HT) format.

When station STA3 receives the RTS frame, it may set its Network Allocation Vector (NAV) timer for the transmission duration of subsequently transmitted frames (for example, a duration of SIFS+CTS frame duration+SIFS+data frame duration+SIFS+ACK frame duration) using the duration information included in the RTS frame. If station STA3 receives the CTS frame, it may set its NAV timer for the transmission duration of subsequently transmitted frames based on the duration information included in the CTS frame. Upon receiving a new frame before the NAV timer expires, station STA3 may update its NAV timer using the duration information from the new frame. Station STA3 does not attempt to access the channel until its NAV timer expires.

When station STA1 receives the CTS frame from station STA2, it may transmit a data frame to station STA2 after a SIFS period elapses from the time when the CTS frame has been completely received. Upon successfully receiving the data frame, station STA2 may transmit an ACK frame in response to the data frame after a SIFS period elapses.

When the NAV timer expires, the third station STA3 may determine whether the channel is busy using carrier sensing. Upon determining that the channel is not occupied by other devices during a DIFS period after the NAV timer has expired, station STA3 may attempt to access the channel after a contention window elapses, according to a backoff process.

When Dual-CTS is enabled, a station that has obtained a transmission opportunity (TXOP) and that has no data to transmit may transmit a CF-End frame to cut short the TXOP. An access point receiving a CF-End frame with the Basic Service Set Identifier (BSSID) of the access point as the destination address may respond by transmitting two additional CF-End frames: the first CF-End frame using Space Time Block Coding (STBC) and the second CF-End frame using non-STBC. A station receiving a CF-End frame resets its NAV timer to 0 at the end of the PHY Protocol Data Unit (PPDU) containing the CF-End frame. FIG. 5 illustrates station STA2 transmitting an ACK frame to acknowledge the successful reception of a frame by the recipient.

With clear demand for higher peak throughput/capacity in Wi-Fi, a new working group for an amendment called 11be (Extreme High Throughput, EHT) has been created to support an increase in the peak PHY rate. Considering 802.11b to 802.11ac, the peak PHY rate has increased by a factor of 5 or 11, as shown in the table of FIG. 6. In the case of 11ax, known as Wi-Fi 6, the 11ax working group focused on improving efficiency, not peak PHY rate, in dense environments. Note that the Max PHY data rate (in gigabits per second (Gbps)) and PHY rate enhancement (factor) for 11be could rely on the highest MCS (e.g., 4,096 QAM and its code rate) to be determined.

The focus of 11be is on wireless local area network (WLAN) indoor and outdoor operation with stationary and pedestrian speeds in the 2.4, 5, and 6 gigahertz (GHz) frequency bands. In addition to the peak PHY rate, different candidate features are under discussion, include some or all of: 320 MHz bandwidth and more efficient utilization of non-contiguous spectrum; multi-band/multi-channel aggregation and operation; 16 spatial streams and multiple-input, multiple-output (MIMO) protocol enhancements; multi-access point coordination (e.g., coordinated and joint transmission); enhanced link adaptation and retransmission protocol (e.g., Hybrid Automatic Repeat Request (HARQ)); and, if needed, adaptation to regulatory rules specific to the 6 GHz spectrum.

Some features, like increasing the bandwidth and the number of spatial streams, are solutions that have been proven to be effective in previous projects focused on increasing link throughput and for which feasibility demonstration is achievable.

As for operation bands (2.4/5/6 gigahertz (GHz)) for 11be, more than 1 GHz of additional unlicensed spectrum is likely to be available around the year 2020 because the 6 GHZ band (5.925-7.125 GHZ) is being considered for unlicensed use. It would allow access points and stations to become tri-band devices. Larger than 160 MHz data transmission (e.g., 320 MHZ) could be considered to increase the max PHY rate. For example, 320 MHz or 160+160 MHz data could be transmitted in the 6 GHz band. Alternatively, 160+160 MHz data could be transmitted across the 5 and 6 GHz bands.

A transmitting station generates a PHY Protocol Data Unit (PPDU) frame and transmits it to a receiving station. The receiving station receives, detects, and processes the PPDU. If an Extremely High Throughput (EHT) PPDU frame comprises a legacy part (e.g., an L-STF field, an L-LTF field, and an L-SIG field), an EHT-SIG-A field, an EHT-SIG-B field, an EHT-HARQ field, an EHT-STF field, an EHT-LTF field, and an EHT-DATA field, then the table of FIG. 7 describes the fields of the EHT PPDU frame in more detail. However, many fields remain empty and are yet to be determined for further discussion.

The distributed nature of channel access networks, such as Institute of Electrical and Electronics Engineers (IEEE) 802.11 wireless local area networks (WLANs), makes the carrier sense mechanism important for collision-free operation. The physical carrier sense of one station is responsible for detecting the transmissions of other stations. However, it may be impossible to detect every single case in some circumstances. For example, one station, which may be a long distance away from another station, may see the medium as idle and begin transmitting frames as well. To overcome this hidden node problem, the network allocation vector (NAV) has been introduced. However, as the IEEE 802.11 standard evolves to include multiple users' simultaneous transmission/reception scheduled within a BSS, such as UL/DL MU transmission in a cascaded manner, modified or newly defined mechanisms may be needed.

In this disclosure, multi-user (MU) transmission refers to cases where multiple frames are transmitted to or from multiple stations simultaneously using different resources, wherein examples of different resources are different frequency resources in OFDMA transmission and different spatial streams in multi-user multiple-input, multiple-output (MU-MIMO) transmission. Therefore, DL-OFDMA, DL-MU-MIMO, UL-OFDMA, and UL-MU-MIMO are examples of MU transmission.

Wireless local area network (WLAN) systems rely on the retransmission of medium access control (MAC) MPDUs when the TX (transmitter) does not receive the acknowledgment from the RX (receiver) OR when MPDUs are not decoded at the RX. In this ARQ (automatic repeat request) approach, the receiver discards the last failed MPDU before receiving the newly retransmitted one. With the requirements for enhanced reliability and reduced latency, the 11be working group decided that it should evolve toward hybrid ARQ (HARQ).

There are two methods of HARQ processing. In the Type 1 HARQ scheme, also referred to as chase combining (CC), the signals to be retransmitted in this part are the same as the signals that failed before because all subpackets to be retransmitted use the same puncturing pattern. Puncturing is needed to remove some of the parity bits after encoding with an error-correction code. The reason for using the same puncturing pattern in CC-HARQ is to generate the coded data sequence with forward error correction (FEC) and make the receiver use maximum-ratio combining (MRC) to combine the received bits with the same bits from previous transmissions. In wireless local area network (WLAN) systems, four subpackets are created from one HARQ packet. For example, the information sequences are usually transmitted in packets with a fixed length. At a receiver, error correction and detection are carried out on the whole packet. If the packet is found to be in error, the conventional ARQ scheme is inefficient in the presence of burst errors. To solve this more efficiently, this situation can be improved if subpackets are applied. In subpacket transmissions, only those subpackets that include errors need to be retransmitted.

With subpackets, since the receiver uses both the current and the previously received subpackets to decode, the error probability in decoding decreases as the number of used subpackets increases. The decoding process passes the CRC check and ends when the packet is decoded without errors or the maximum number of subpackets is reached. Basically, because it operates in the stop-and-wait protocol, if the terminal can decode the packet, it sends an ACK to the transmitter. When the transmitter receives the ACK correctly, it terminates the HARQ transmission of the packet. If the terminal cannot decode the packet, it sends a NAK to the transmitter, and the transmitter performs the retransmission process.

In the Type 2 HARQ scheme, also referred to as Incremental Redundancy (IR), different puncturing patterns are used for each subpacket, so the signal of this portion changes for each subpacket. IR uses two puncturing patterns, alternating for odd-numbered and even-numbered transmissions, respectively, resulting in the coded data sequence with the coding rate which is used in IR HARQ. The redundancy scheme of IR improves the LLR (Log Likelihood Ratio) of the parity bits in order to combine information sent across different transmissions due to requests and lowers the code rate as additional subpackets are used, resulting in a lower error rate of the subpackets than CC. The puncturing pattern used in HARQ is indicated by the Subpacket Identity (SPID). The SPID of the first subpacket is always set to 0, and all the systematic bits and the punctured parity bits are transmitted in the first subpacket, and self-decoding is possible when the receiving SNR environment is good. Generally, subpacket SPIDs to be transmitted are in increasing order but can be exchanged except for the first SPID.

As wireless local area network (WLAN) systems have improved, access point coordination has been discussed as a possible technology to be adopted in 11be, where there is a high-level classification depending on various access point coordination schemes. For example, there are two main types of techniques: the first type, called "coordinated," where data for a user is sent from a single access point, and the second type, called "joint," where data for a user is sent from multiple access points.

As for coordinated access point tech, multiple access points are either 1) transmitting on the same frequency resource based on coordination and forming spatial nulls to allow for simultaneous transmission from multiple access points, or 2) transmitting on orthogonal frequency resources by coordinating and splitting the spectrum to use it more efficiently. As for joint access point tech, multiple access points are transmitting jointly to a given user.

The solutions provided herein have been described with reference to a wireless LAN system; however, it should be understood that these solutions are also applicable to other network environments, such as cellular telecommunication networks, wired networks, etc.

An embodiment of the invention may be an article of manufacture in which a non-transitory machine-readable medium (such as microelectronic memory) has stored thereon instructions which program one or more data processing components (generically referred to here as a "processor" or "processing unit") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an access point station, a non-access point station, or another network or computing device) that includes one or more hardware and software logic structures for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

In the conventional IEEE 802.11 standards, including IEEE 802.11be, stations (STAs) can transmit their own packets after sensing the channel according to the distributed coordination function (DCF) rule. Even though a STA has emergency traffic that should be sent within a short delay, the STA cannot transmit the emergency traffic if the channel is occupied by another STA and the STA cannot acquire a channel access opportunity. However, depending on the application area, the transmission of emergency data, i.e., latency-sensitive data, can be one of the essential requirements. To effectively handle latency-sensitive data, a restricted Target Wake Time (rTWT) has been introduced in IEEE 802.11be. In the rTWT scheme, all STAs in the basic service set (BSS) should end their transmissions before the beginning of the rTWT service period (rTWT SP), and the low-latency traffic (LLT) STA can transmit its LLT packet during this period.

Figure 8:
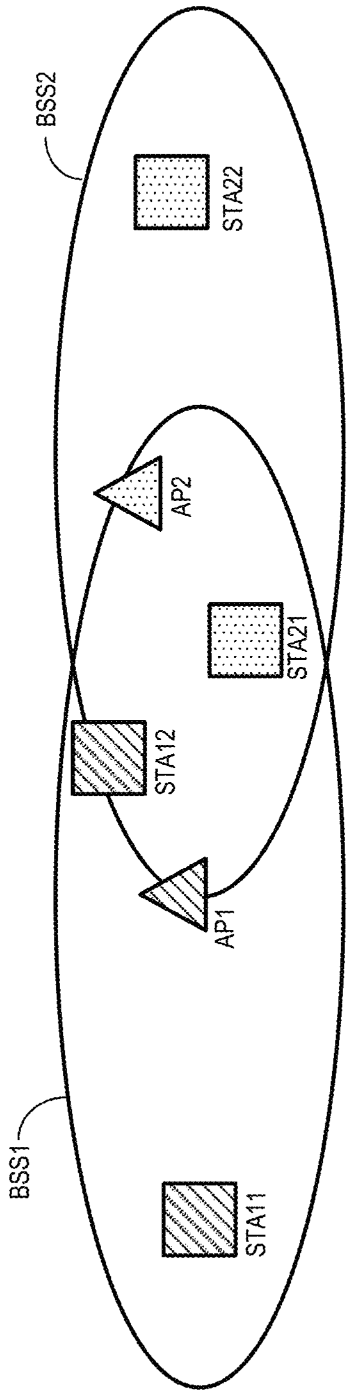
FIG. 8 illustrates an example of an overlapping basic service set network topology, in accordance with some embodiments of the present disclosure.
Figure 9:
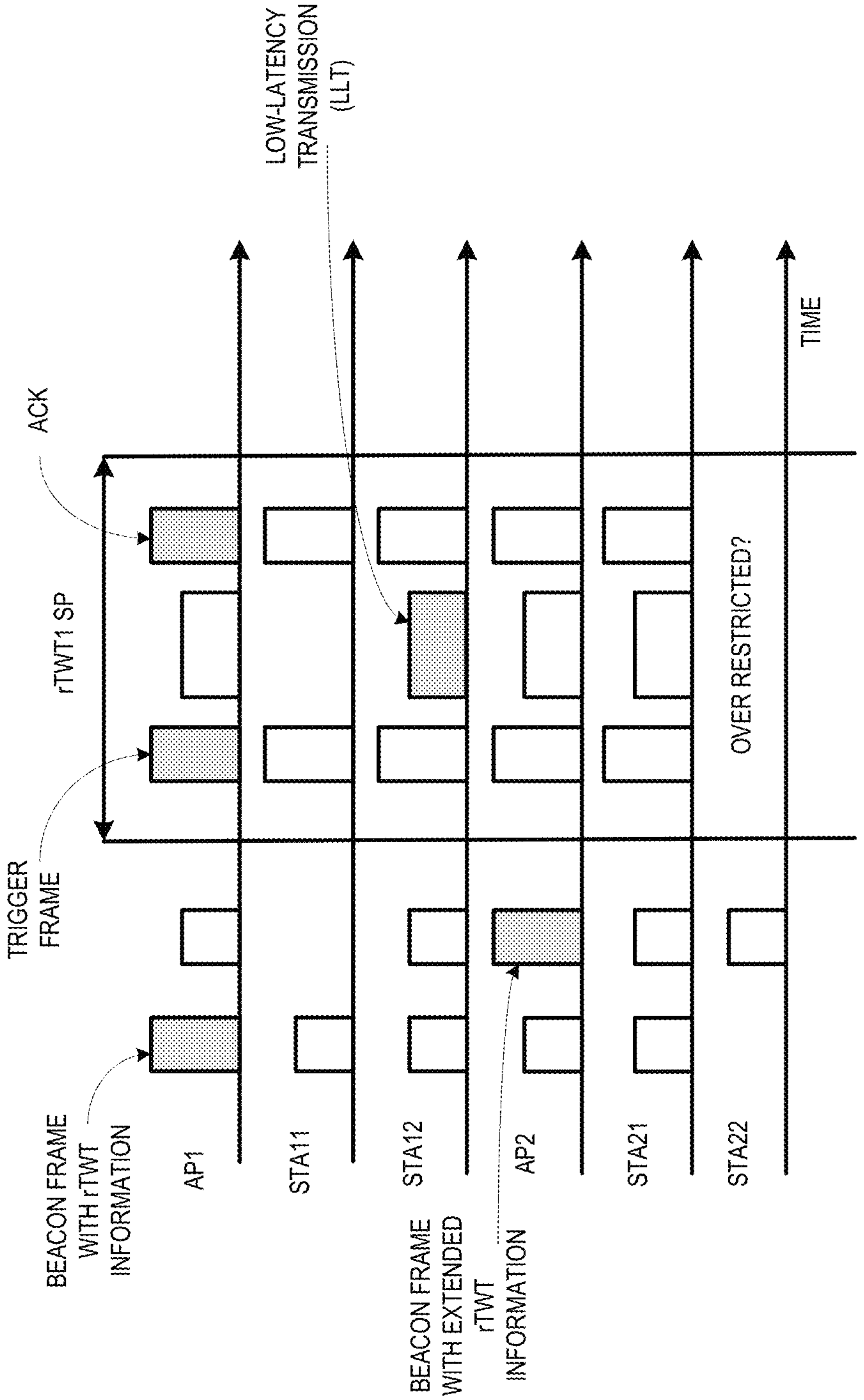
FIG. 9 illustrates an example of an extended restricted target wake time operation in an overlapping basic service set network topology, in accordance with some embodiments of the present disclosure.

In a dense network where multiple BSSs are overlapped, however, there can be collisions between LLT packets and the transmitted packets from STAs in the overlapping BSS (OBSS) because the OBSS STAs might ignore the rTWT SP from other BSSs. To overcome this problem, an extended rTWT scheme can be considered, in which OBSS access points (APs) forward the rTWT information to OBSS STAs via their beacon frames. An example of the extended rTWT scheme is illustrated in FIGS. 8 and 9. FIG. 8 shows an example OBSS network.

In the overlapping basic service set (OBSS) network, as shown in FIG. 8, it is assumed that access point 1 (AP1) sends a beacon frame containing a restricted target wake time (rTWT) parameter set. This rTWT parameter set allows for low-latency traffic (LLT) uplink transmission from station 12 (STA12), which is associated with AP1 in basic service set 1 (BSS1). However, station 21 (STA21) and station 22 (STA22), which are associated with access point 2 (AP2) in basic service set 2 (BSS2), do not adhere to the rTWT schedule specified by AP1. As a result, the LLT transmission from STA12 in BSS1 cannot be protected when STA21 and/or STA22 in BSS2 send their packets, potentially leading to collisions and disruption of the low-latency transmission.

To address the OBSS problem, access point 2 (AP2) can forward the restricted target wake time (rTWT) parameter set, denoted as rTWT1, which it receives from the beacon frames of access point 1 (AP1). AP2 includes this forwarded rTWT1 parameter set in its own beacon frames, a mechanism known as the extended rTWT. Before forwarding the rTWT1 parameter set, AP1 and AP2 can negotiate the acceptance and forwarding of the rTWT1 information by exchanging an "extended rTWT request frame" and an "extended rTWT response frame."

As illustrated in FIG. 9, when AP2 forwards the rTWT1 parameter set via its beacon frame, the rTWT1 service period (SP) is established in both basic service set 1 (BSS1) and basic service set 2 (BSS2). Consequently, the data packet sent from station 12 (STA12) to AP1 can be delivered without interference from other stations in the OBSS. In FIG. 9, the shaded squares represent transmitted packets, while the blank squares indicate the reception of packets at the corresponding stations and access points.

In FIG. 8, all the stations (STAs) in basic service set 1 (BSS1) and basic service set 2 (BSS2) are restricted by the restricted target wake time (rTWT) parameter set, denoted as rTWT1, which is included in the beacon frames from access point 1 (AP1) and access point 2 (AP2). However, according to the network topology shown in FIG. 8, station 22 (STA22) receives the beacon frame containing the rTWT1 parameter set from AP2 but does not receive the beacon frame directly from AP1. Since AP1 is the recipient of the data packet during the rTWT1 service period (SP) and STA22 is located far away from AP1, the restriction imposed on STA22 by the extended rTWT can be considered an over-restriction. To address this over-restriction issue in the extended rTWT mechanism, the following operation rules can be considered:

Operation Rule 1-If an overlapping basic service set (OBSS) STA receives a beacon frame with an rTWT parameter set directly from another AP, as well as the extended (forwarded) rTWT parameter set from its own AP, the STA must adhere to the extended rTWT from the AP of its own BSS. In other words, the STA is not allowed to transmit any signal during the rTWT SP.

Operation Rule 2-Conversely, if an OBSS STA receives only the extended (forwarded) rTWT parameter set from its own AP and does not receive the rTWT parameter set directly from the other AP, the STA is not required to adhere to the extended rTWT.

Here's the proofread and rewritten version of the text for clarity:

Alternatively, with Operation Rule 2 above, where an overlapping basic service set (OBSS) station (STA) receives only the extended (forwarded) restricted target wake time (rTWT) parameter set from its own access point (AP) and does not receive the beacon frame containing the original rTWT parameter set directly from the other AP, the OBSS STA can interpret the rTWT as a regular rTWT that allows its own transmission.

Figure 10:
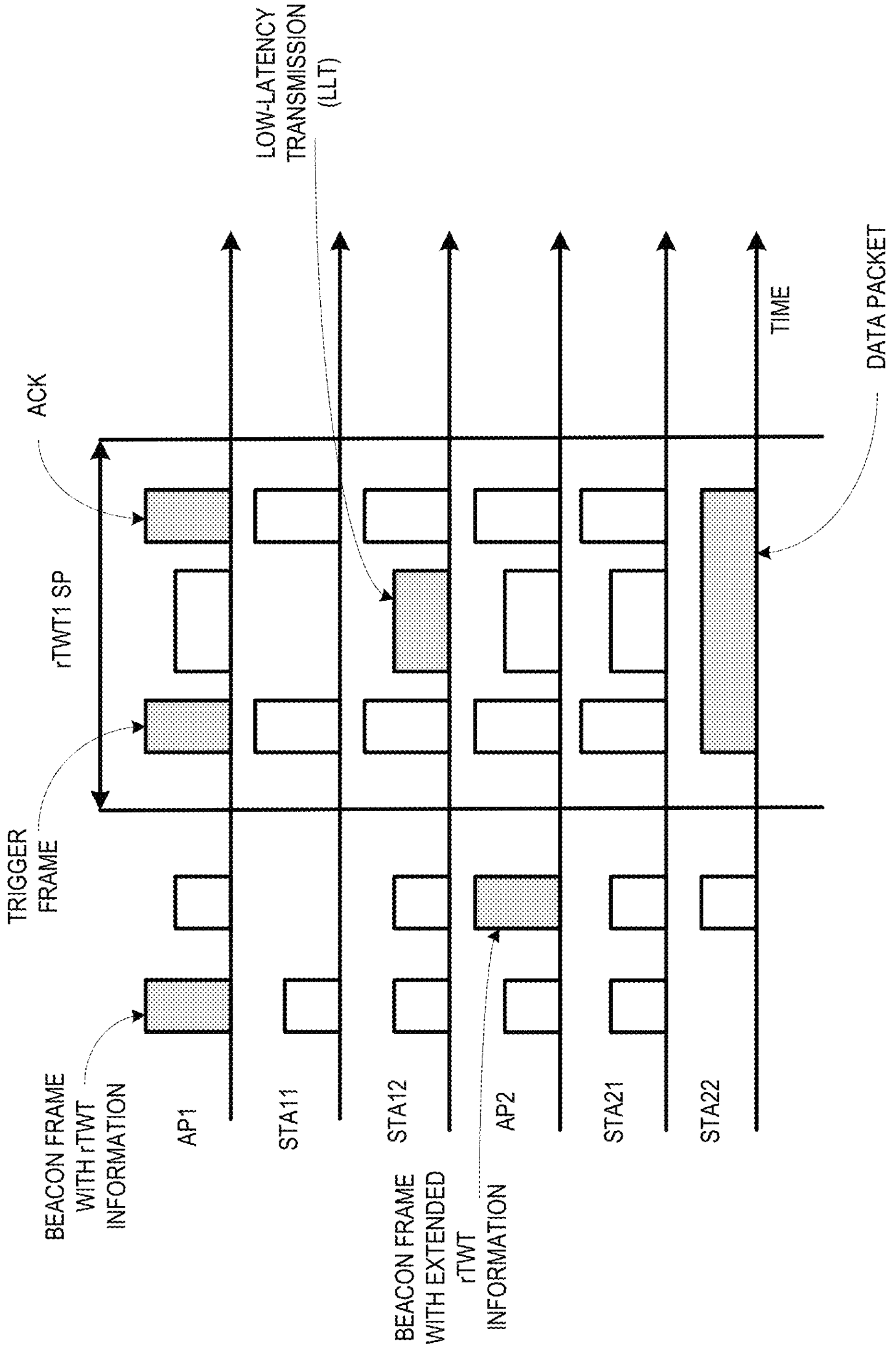
FIG. 10 illustrates an example of a disclosed scheme for extended restricted target wake time operation, in accordance with some embodiments of the present disclosure.

An example of the proposed approach for the extended rTWT operation is illustrated in FIG. 10. In FIG. 10, the same network topology and operation scenario as depicted in FIGS. 8 and 9 are assumed.

In the operation rule described above, the transmit power of the packets transmitted by the overlapping basic service set (OBSS) stations was not considered, such as the data packet transmission from station 22 (STA22) to access point 2 (AP2) shown in FIG. 10. As an extension of the proposed approach, a limit to the transmit power of STA22 can be applied to protect the restricted target wake time (rTWT) service period (SP) of basic service set 1 (BSS1), denoted in FIG. 10 as rTWT1 SP.

To determine the transmit power limit, we can consider the path loss of two link is considered: the link between access point 1 (AP1) and access point 2 (AP2), and the link between AP2 and a station (STA), where the STA refers to station 22 (STA22) in FIG. 10. The path loss for the AP1-AP2 link can be calculated using Equation 1:

$$\text{PL\_AP1\_AP2} = \text{AP1\_TX\_POWER (Beacon from } AP1) - \text{AP2\_RX\_POWER (Beacon from } AP1) \quad \text{[Equation 1]}$$

Here, PL_AP1_AP2 represents the path loss between AP1 and AP2. AP1_TX_POWER (Beacon from AP1) is the transmit power of the beacon frame sent by AP1. AP2_RX_POWER (Beacon from AP1) is the received power of the beacon frame from AP1 measured at AP2.

$$\text{PL\_AP2\_STA} = \text{AP2\_TX\_POWER (Beacon from } AP2) - \text{STA\_RX\_POWER (Beacon from } AP2) \quad \text{Equation 2]}$$

Here, PL_AP2_STA represents the path loss between access point 2 (AP2) and the station (STA), which refers to station 22 (STA22) in FIG. 10. AP2_TX_POWER (Beacon from AP2) is the transmit power of the beacon frame sent by AP2. STA_RX_POWER (Beacon from AP2) is the received power of the beacon frame from AP2 measured at the STA In Equations 1 and 2 above, AP1_TX_POWER represents the transmit power of the beacon frame sent by access point 1 (AP1). AP2_TX_POWER represents the transmit power of the beacon frame sent by AP2. AP2_RX_POWER represents the received power of the beacon frame from AP1 measured at AP2. STA_RX_POWER represents the received power of the beacon frame from AP2 measured at the STA. All the parameters in Equations 1 and 2 are expressed in decibels (dB).

To ensure that the interference power from station 22 (STA22) to access point 1 (AP1) is below the acceptable interference level, the following condition should be met:

$$\text{STA\_TX\_POWER} - \text{PL\_AP2\_STA} - \text{PL\_AP1\_AP2} \leq \text{ACCEPT\_INTERFERENCE\_LEVEL} + \text{Margin} \quad \text{[Equation 3]}$$

Herein, STA_TX_POWER is the transmit power of STA22. PL_AP2_STA is the path loss between access point 2 (AP2) and STA22, as calculated in Equation 2 above. PL_AP1_AP2 is the path loss between AP1 and AP2, as calculated in Equation 1 above. ACCEPT_INTERFERENCE_LEVEL is the acceptable interference level at AP1. Margin is an additional buffer to account for any uncertainties or fluctuations in the system.

The ACCEPT_INTERFERENCE_LEVEL is calculated using the following equation:

$$\text{ACCEPT\_INTERFERENCE\_LEVEL} = \text{UL\_TARGET\_RSSI} - \text{MIN\_SNR\_MCS} \quad \text{[Equation 4]}$$

Here, UL_TARGET_RSSI denotes the expected received signal power of the uplink (UL) signal from station 12

(STA12). This value is indicated by the trigger frame sent from access point 1 (AP1). MIN_SNR_MCS is the minimum signal-to-noise ratio (SNR) value required to achieve the desired packet error rate (PER) performance for the highest modulation and coding scheme (MCS) used in the uplink transmission from STA12.

By rearranging Equation 3, the following equation is obtained:

$$STA\_TX\_POWER \leq AP1\_TX\_POWER + Margin + ACCEPT\_INTERFERENCE\_LEVEL - AP2\_RX\_POWER + AP2\_TX\_POWER - STA\_RX\_POWER \quad \text{[Equation 5]}$$

In the right-hand side of Equation 5, "AP1_TX_POWER+Margin+ACCEPT_INTERFERENCE_LEVEL" is available at access point 1 (AP1). "−AP2_RX_POWER+AP2_TX_POWER" is available at access point 2 (AP2). "−STA_RX_POWER" is available at station 22 (STA22).

If the beacon frames include the following information fields in addition to the restricted target wake time (rTWT) parameter set, station 22 (STA22) can calculate its maximum transmit power limit as in Equation 6.

$$EXTENDED\_rTWT\_METRIC1 = AP1\_TX\_POWER + Margin + ACCEPT\_INTERFERENCE\_LEVEL \quad \text{[Equation 6]}$$

Here, EXTENDED_rTWT_METRIC1 is a new information field that needs to be included in the beacon frame sent by access point 1 (AP1). AP1_TX_POWER is the transmit power of the beacon frame sent by AP1. Margin is an additional buffer to account for any uncertainties or fluctuations in the system. ACCEPT_INTERFERENCE_LEVEL is the acceptable interference level at AP1, as calculated in Equation 4 above.

$$EXTENDED\_rTWT\_METRIC2 = AP2\_TX\_POWER - AP2\_RX\_POWER \quad \text{[Equation 7]}$$

Here, EXTENDED_TWT_METRIC2 is another new information field that needs to be included in the beacon frame sent by access point 2 (AP2). AP2_TX_POWER is the transmit power of the beacon frame sent by AP2. AP2_RX_POWER is the received power of the beacon frame from AP1 measured at AP2. EXTENDED_rTWT_METRIC1 is included in the beacon frame sent by AP1, while EXTENDED_TWT_METRIC2 is included in the beacon frame sent by AP2. With these two metrics, STA22 can calculate its maximum transmit power using the following equation:

$$STA\_TX\_POWER \leq EXTENDED\_rTWT\_METRIC1 + EXTENDED\_rTWT\_METRIC2 - STA\_RX\_POWER \quad \text{[Equation 8]}$$

Here, STA_TX_POWER is the maximum transmit power of STA22. EXTENDED_rTWT_METRIC1 is obtained from the beacon frame sent by AP1. EXTENDED_rTWT_METRIC2 is obtained from the beacon frame sent by AP2. STA_RX_POWER is the received power of the beacon frame from AP2 measured at STA22.

Instead of using Equation 3, we can determine the transmit power limit using the following equation:

$$STA\_TX\_POWER - PL\_AP1\_AP2 \leq ACCEPT\_INTERFERENCE\_LEVEL + Margin \quad \text{[Equation 9]}$$

Here, STA_TX_POWER is the transmit power of station 22 (STA22). PL_AP1_AP2 is the path loss between access point 1 (AP1) and access point 2 (AP2). ACCEPT_INTERFERENCE_LEVEL is the acceptable interference level at AP1. Margin is an additional buffer to account for any uncertainties or fluctuations in the system.

Equation 9 determines a more conservative transmit power limit compared to Equation 3. By rearranging Equation 9, we obtain:

$$STA\_TX\_POWER \leq AP1\_TX\_POWER + Margin + ACCEPT\_INTERFERENCE\_LEVEL - AP2\_RX\_POWER \quad \text{[Equation 10]}$$

Here, AP1_TX_POWER is the transmit power of the beacon frame sent by AP1. AP2_RX_POWER is the received power of the beacon frame from AP1 measured at AP2.

To facilitate the calculation of the maximum transmit power for STA22, we define two new information fields to be included in the beacon frames sent by AP1 and AP2:

$$EXTENDED\_rTWT\_METRIC3 = AP1\_TX\_POWER + Margin + ACCEPT\_INTERFERENCE\_LEVEL \quad \text{[Equation 11]}$$

$$EXTENDED\_rTWT\_METRIC4 = AP2\_RX\_POWER \quad \text{[Equation 12]}$$

Using these metrics, STA22's maximum transmit power can be calculated as follows:

$$STA\_TX\_POWER \leq EXTENDED\_rTWT\_METRIC3 - EXTENDED\_rTWT\_METRIC4 \quad \text{[Equation 13]}$$

Figure 11:
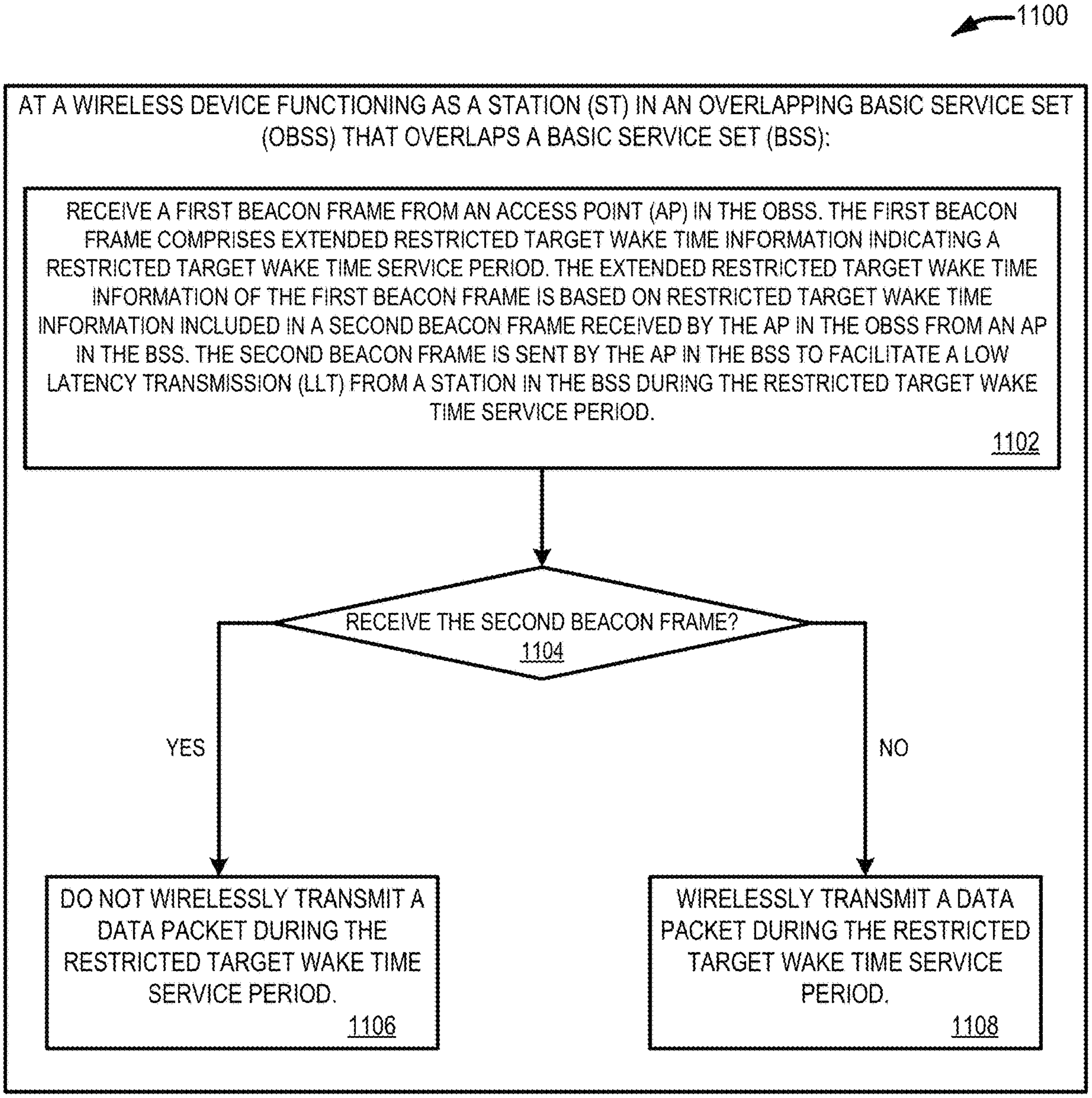
FIG. 11 is a flowchart of a method for transmit power control for extended restricted wake time in an overlapping basic service set environment at a wireless device functioning as a station in an overlapping basic service set that overlaps a basic service set, in accordance with some embodiments of the present disclosure.

FIG. 11 is a flowchart of a method 1100 for transmit power control for extended restricted wake time in an overlapping basic service set environment at a wireless device functioning as a station in an overlapping basic service set that overlaps a basic service set.

The method (1100) encompasses a technique for managing wireless communications in an overlapping basic service set (OBSS) scenario, where the coverage area of one basic service set (BSS) overlaps with another. An objective is to facilitate low latency transmissions (LLT) from a station in the BSS while minimizing interference from stations in the OBSS.

The method (1100) is performed by a wireless device functioning as a station (ST) in the OBSS. The ST receives (1102) a first beacon frame from an access point (AP) in the OBSS. This first beacon frame contains extended restricted target wake time information, which indicates a restricted target wake time service period. The extended restricted target wake time information in the first beacon frame is derived from the restricted target wake time information included in a second beacon frame. This second beacon frame is sent by an AP in the BSS to the AP in the OBSS to facilitate an LLT from a station in the BSS during the restricted target wake time service period.

At decision (1104), if the ST in the OBSS does not receive the second beacon frame directly from the AP in the BSS, it can still wirelessly transmit (1108) a data packet during the restricted target wake time service period. This transmission is done to facilitate the LLT from the station in the BSS, even though the ST in the OBSS does not have direct access to the second beacon frame. Otherwise, it does not transmit (1106) the data packet during the restricted target wake time service period.

The method (1100) allows stations in the OBSS to support low latency transmissions in the BSS by utilizing the extended restricted target wake time information received from their own AP, even when they do not directly receive the beacon frame from the AP in the BSS. This approach helps to minimize interference and ensure the successful delivery of low latency transmissions in the overlapping wireless network environment.

Figure 12:
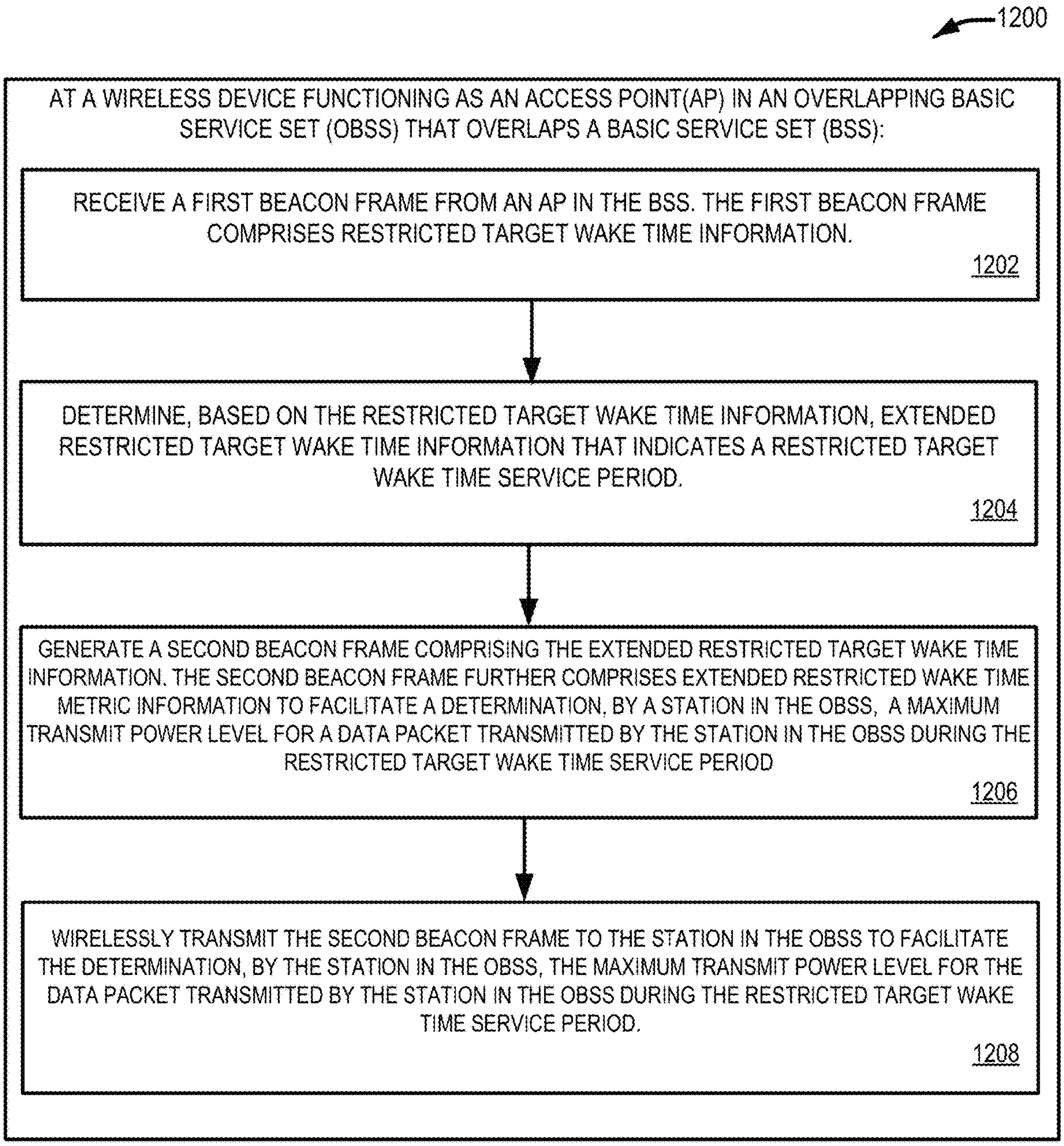
FIG. 12 is a flowchart of a method for transmit power control for extended restricted wake time in an overlapping basic service set environment at a wireless device functioning as an access point in an overlapping basic service set that overlaps a basic service set, in accordance with some embodiments of the present disclosure.

FIG. 12 is a flowchart of a method 1200 for transmit power control for extended restricted wake time in an overlapping basic service set environment at a wireless device functioning as an access point in an overlapping basic service set that overlaps a basic service set.

The method (1200) encompasses a technique for managing wireless communications in an overlapping basic service set (OBSS) scenario, where the coverage area of one basic service set (BSS) overlaps with another. An objective is to facilitate the determination of the maximum transmit power level for a station in the OBSS during a restricted target wake time service period.

The method (1200) is performed by a wireless device functioning as an access point (AP) in the OBSS. The AP in the OBSS receives (1202) a first beacon frame from an AP in the BSS. This first beacon frame contains restricted target wake time information. Based on this information, the AP in the OBSS determines (1204) extended restricted target wake time information, which indicates a restricted target wake time service period.

The AP in the OBSS then generates (1206) a second beacon frame that includes the extended restricted target wake time information. Additionally, this second beacon frame contains extended restricted wake time metric information. The purpose of this metric information is to help a station in the OBSS determine the maximum transmit power level for a data packet that the station transmits during the restricted target wake time service period.

Finally, the AP in the OBSS wirelessly transmits (1208) the second beacon frame to the station in the OBSS. By receiving this second beacon frame, the station in the OBSS can determine the maximum transmit power level for its data packet transmission during the restricted target wake time service period.

This method (1200) enables an AP in the OBSS to provide the necessary information to a station in the OBSS, allowing the station to determine its maximum transmit power level during a restricted target wake time service period. This approach helps to manage interference and ensure the successful transmission of data packets in the overlapping wireless network environment.

In the context of methods (1100) and (1200), an access point (AP) refers to a wireless network device that acts as a central hub for wireless communication within a basic service set (BSS) or an overlapping basic service set (OBSS). The AP is responsible for coordinating and managing the wireless communication between the stations (STAs) associated with it.

In a BSS, the AP is the main point of contact for all STAs within its coverage area. It regularly broadcasts beacon frames containing important network information, such as the restricted target wake time information, which helps to manage the timing of low latency transmissions (LLT) from STAs in the BSS.

In an OBSS scenario, where the coverage areas of multiple BSSs overlap, there are APs present in both the BSS and the OBSS. The AP in the OBSS receives beacon frames from the AP in the BSS, which contain restricted target wake time information. Based on this information, the AP in the OBSS determines extended restricted target wake time information and includes it in its own beacon frames, along with extended restricted wake time metric information. These beacon frames are then transmitted to the STAs in the OBSS to facilitate the determination of the maximum transmit power level for their data packets during the restricted target wake time service period.

A restricted target wake time (rTWT) is a mechanism introduced in the IEEE 802.11 standard to facilitate low latency transmissions (LLT) in wireless networks. In the context of the methods (1100) and (1200), the rTWT is used to manage the timing of LLT from stations (STAs) in a basic service set (BSS) and to coordinate the transmissions of STAs in an overlapping basic service set (OBSS) to minimize interference.

The rTWT information is included in beacon frames sent by the access point (AP) in the BSS. This information is used to define a specific time window referred to as the restricted target wake time service period (rTWT SP). During this service period, STAs in the BSS are allowed to transmit their LLT packets, while other STAs are restricted from transmitting to avoid interference.

In an OBSS scenario, the AP in the OBSS receives the rTWT information from the AP in the BSS through beacon frames. The AP in the OBSS then determines an extended rTWT based on the received rTWT information and includes it in its own beacon frames. The extended rTWT also indicates an rTWT SP, during which STAs in the OBSS are expected to manage their transmissions to minimize interference with the LLT in the BSS.

The rTWT and rTWT SP are components in managing the timing and coordination of wireless transmissions in both BSS and OBSS scenarios. They help to ensure that LLT packets from STAs in the BSS are given priority during specific time windows, while also providing a mechanism for STAs in the OBSS to manage their transmissions and minimize interference during these periods.

In the context of the methods (1100) and (1200), a beacon frame is a type of management frame that is periodically broadcast by an access point (AP) in a wireless network. The primary purpose of a beacon frame is to announce the presence of the wireless network and to provide essential information about the network to stations (STAs) within its coverage area.

Beacon frames contain various types of information, including the network's service set identifier (SSID), timestamp, supported data rates, and other network-related parameters. In the context of the methods (1100) and (1200), the beacon frames also include restricted target wake time (rTWT) information, which is used for managing low latency transmissions (LLT) in the basic service set (BSS) and coordinating transmissions in the overlapping basic service set (OBSS).

In method (1100), the AP in the OBSS receives a beacon frame from the AP in the BSS, which contains rTWT information. The AP in the OBSS then includes extended rTWT information based on the received rTWT in its own beacon frames, which are sent to the STAs in the OBSS. This allows the STAs in the OBSS to be aware of the rTWT service period and manage their transmissions accordingly, even if they do not directly receive the beacon frame from the AP in the BSS.

In method (1200), the AP in the OBSS receives a beacon frame from the AP in the BSS containing rTWT information. It then determines extended rTWT information and includes it in its own beacon frames, along with extended rTWT metric information. These beacon frames are then transmitted to the STAs in the OBSS, enabling them to determine their maximum transmit power level during the rTWT service period.

In the context of the methods (1100) and (1200), a data packet refers to a unit of data that is transmitted over a wireless network by a station (STA) to an access point (AP) or another STA. Data packets contain the actual information being sent, such as voice, video, or other application data.

In method (1100), the STA in the overlapping basic service set (OBSS) wirelessly transmits a data packet during the restricted target wake time (rTWT) service period, even if it has not received the beacon frame directly from the AP in the basic service set (BSS). This transmission is done to facilitate the low latency transmission (LLT) from the STA in the BSS. By sending its own data packet during the rTWT service period, the STA in the OBSS helps to minimize interference and ensure the successful transmission of the LLT packet from the STA in the BSS.

In method (1200), the AP in the OBSS includes extended rTWT metric information in its beacon frames to help the STAs in the OBSS determine their maximum transmit power level for their data packets during the rTWT service period. By controlling the transmit power of the data packets sent by STAs in the OBSS, the method aims to minimize interference with the LLT packets from the STAs in the BSS, while still allowing the STAs in the OBSS to transmit their own data.

Data packets are the elements of wireless communication, carrying the actual information being transmitted between STAs and APs. The methods (1100) and (1200) focus on managing the transmission of data packets during rTWT service periods to ensure the successful delivery of LLT packets and to minimize interference in overlapping wireless networks.

The maximum transmit power level in the context of methods (1100) and (1200) refers to the upper limit of the power that a station (STA) in the overlapping basic service set (OBSS) is allowed to use when transmitting its data packets during the restricted target wake time (rTWT) service period. This maximum transmit power level is determined based on the extended rTWT metric information provided by the access point (AP) in the OBSS.

In method (1200), the AP in the OBSS includes extended rTWT metric information in its beacon frames, which is used by the STAs in the OBSS to calculate their maximum transmit power level. By limiting the transmit power of the STAs in the OBSS during the rTWT service period, the method aims to minimize interference with the low latency transmissions (LLT) from the STAs in the basic service set (BSS), while still allowing the STAs in the OBSS to transmit their own data packets.

The determination of the maximum transmit power level is crucial for maintaining a balance between allowing STAs in the OBSS to transmit their data packets and protecting the LLT packets from STAs in the BSS. By reducing the transmit power of the STAs in the OBSS during the rTWT service period, the interference caused to the LLT packets in the BSS is minimized, increasing the chances of successful transmission.

Although method (1100) as described above does not explicitly mention the maximum transmit power level, it is related to the concept since the STA in the OBSS transmits its data packet during the rTWT service period to facilitate the LLT from the STA in the BSS. By coordinating the transmissions and potentially limiting the transmit power of STAs in the OBSS, the method (1100) helps to ensure the successful delivery of LLT packets.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

at a wireless device functioning as a station in an overlapping basic service set that overlaps a basic service set:

receiving a first beacon frame from an access point in the overlapping basic service set, wherein the first beacon frame comprises extended restricted target wake time information indicating a restricted target wake time service period, wherein the extended restricted target wake time information of the first beacon frame is based on restricted target wake time information included in a second beacon frame received by the access point in the overlapping basic service set from an access point in the basic service set, wherein the second beacon frame is sent by the access point in the basic service set to facilitate a low latency transmission from a station in the basic service set during the restricted target wake time service period; and based on the station in the overlapping basic service set not receiving the second beacon frame, wirelessly transmitting a data packet to facilitate the low latency transmission from the station in the basic service set during the restricted target wake time service period.

2. The method of claim 1, further comprising:

determining a maximum transmit power for the data packet; and wirelessly transmitting the data packet at or below the maximum transmit power.

3. The method of claim 2, wherein the maximum transmit power for the data packet is based on:

a path loss of a link between the access point in the basic service set and the access point in the overlapping basic service set, a path loss of a link between the access point in the overlapping basic service set and the station in the overlapping basic service set, an acceptable interference level for the access point in the basic service set, and a margin.

4. The method of claim 3, wherein the path loss of the link between the access point in the basic service set and the access point in the overlapping basic service set is based on a power level of the second beacon frame as transmitted by the access point in the basic service set, and a power level of the second beacon frame as received by the access point in the overlapping basic service set; and wherein the path loss of the link between the access point in the overlapping basic service set and the station in the overlapping basic service set is based on a power level of the first beacon frame as transmitted by the access point in the overlapping basic service set, and a power level of the first beacon frame as received by the station in the overlapping basic service set.

5. The method of claim 3, wherein the acceptable interference level at the access point in the basic service set is based on:

a target received signal strength indicator at the access point in the basic service set for an uplink transmission from a station in the basic service set, and a minimum signal-to-noise-ratio for a highest modulation and coding scheme that yields a target packet error rate for the uplink transmission from the station in the basic service set.

6. The method of claim 2, wherein the maximum transmit power for the data packet is based on:

a power level of the second beacon frame as transmitted by the access point in the basic service set, a margin, an acceptable interference level for the access point in the basic service set, a power level of the second beacon frame as received by the access point in the overlapping basic service set, a power level of the first beacon frame as transmitted by the access point in the overlapping basic service set, and a power level of the first beacon frame as received by the station in the overlapping basic service set.

7. The method of claim 2, wherein the maximum transmit power for the data packet is based on:

an extended restricted target wake time metric included in the second beacon frame, an extended restricted target wake time metric included in the first beacon frame, and a power level of the first beacon frame as received by the station in the overlapping basic service set.

8. The method of claim 7, wherein the extended restricted target wake time metric included in the second beacon frame is based on a power level of the second beacon frame as transmitted by the access point in the basic service set, a margin, and an acceptable interference level for the access point in the basic service set; and wherein the extended restricted target wake time metric included in the first beacon frame is based on a power level of the first beacon frame as transmitted by the access point in the overlapping basic service set, and a power level of the second beacon frame as received by the access point in the overlapping basic service set.

9. The method of claim 2, wherein the maximum transmit power for the data packet is based on:

a path loss of a link between the access point in the basic service set and the access point in the overlapping basic service set, an acceptable interference level for the access point in the basic service set, and a margin.

10. The method of claim 2, wherein the maximum transmit power for the data packet is based on:

a power level of the second beacon frame as transmitted by the access point in the basic service set, a margin, an acceptable interference level for the access point in the basic service set, and a power level of the second beacon frame as received by the access point in the overlapping basic service set.

11. The method of claim 2, wherein the maximum transmit power for the data packet is based on:

an extended restricted target wake time metric included in the second beacon frame, and an extended restricted target wake time metric included in the first beacon frame.

12. The method of claim 11, wherein the extended restricted target wake time metric included in the second beacon frame is based on a power level of the second beacon frame as transmitted by the access point in the basic service set, a margin, and an acceptable interference level for the access point in the basic service set; and wherein the extended restricted target wake time metric included in the first beacon frame is based on a power level of the first beacon frame as transmitted by the access point in the overlapping basic service set.

13. A method comprising:

at a wireless device functioning as an access point in an overlapping basic service set that overlaps a basic service set:

receiving a first beacon frame from an access point in the basic service set, wherein the first beacon frame comprises restricted target wake time information;

determining, based on the restricted target wake time information, extended restricted target wake time information that indicates a restricted target wake time service period;

generating a second beacon frame comprising the extended restricted target wake time information, wherein the second beacon frame further comprises extended restricted wake time metric information to facilitate a determination, by a station in the overlapping basic service set, a maximum transmit power level for a data packet transmitted by the station in the overlapping basic service set during the restricted target wake time service period; and wirelessly transmitting the second beacon frame to the station in the overlapping basic service set to facilitate the determination, by the station in the overlapping basic service set, the maximum transmit power level for the data packet transmitted by the station in the overlapping basic service set during the restricted target wake time service period.

14. The method of claim 13, wherein the extended restricted wake time metric information is based on:

a power level of the first beacon frame as transmitted by the access point in the basic service set, a margin, an acceptable interference level for the access point in the basic service set, a power level of the second beacon frame as transmitted by the access point in the overlapping basic service set, and a power level of the first beacon frame as received by the access point in the overlapping basic service set.

15. The method of claim 13, wherein the extended restricted wake time metric information is based on:

a power level of the first beacon frame as transmitted by the access point in the basic service set, a margin, an acceptable interference level for the access point in the basic service set, and a power level of the first beacon frame as received by the access point in the overlapping basic service set.

16. A wireless device to function as a station in an overlapping basic service set that overlaps a basic service set, the wireless device comprising: a radio frequency transceiver; a memory device storing a set of instructions; and a processor coupled to the memory device, wherein the set of instructions when executed by the processor causes the station in the overlapping basic service set to perform:

receiving a first beacon frame from an access point in the overlapping basic service set, wherein the first beacon frame comprises extended restricted target wake time information indicating a restricted target wake time service period, wherein the extended restricted target wake time information of the first beacon frame is based on restricted target wake time information included in a second beacon frame received by the access point in the overlapping basic service set from an access point in the basic service set, wherein the second beacon frame is sent by the access point in the basic service set to trigger a low latency transmission from a station in the basic service set during the restricted target wake time service period; and based on the station in the overlapping basic service set not receiving the second beacon frame, wirelessly transmitting a data packet during the restricted target wake time service period.

17. The wireless device of claim 16, wherein the set of instructions when executed by the processor further causes the station in the overlapping basic service set to perform:

determining a maximum transmit power for the data packet; and wirelessly transmitting the data packet at or below the maximum transmit power.

18. A wireless device to function as an access point in an overlapping basic service set that overlaps a basic service set, the wireless device comprising:

a radio frequency transceiver;

a memory device storing a set of instructions; and a processor coupled to the memory device, wherein the set of instructions when executed by the processor causes the access point in the overlapping basic service set to perform:

receiving a first beacon frame from an access point in the basic service set, wherein the first beacon frame comprises restricted target wake time information;

determining extended restricted target wake time information that indicates a restricted target wake time service period based on the restricted target wake time information;

generating a second beacon frame comprising the extended restricted target wake time information, wherein the second beacon frame further comprises extended restricted wake time metric information to facilitate a determination, by a station in the overlapping basic service set, a maximum transmit power level for a data packet transmitted by the station in the overlapping basic service set during the restricted target wake time service period; and wirelessly transmitting the second beacon frame to the station in the overlapping basic service set to facilitate the determination, by the station in the overlapping basic service set, the maximum transmit power level for the data packet transmitted by the station in the overlapping basic service set during the restricted target wake time service period.

19. The wireless device of claim 18, wherein the extended restricted wake time metric information is based on:

a power level of the first beacon frame as transmitted by the access point in the basic service set, a margin, an acceptable interference level for the access point in the basic service set, a power level of the second beacon frame as transmitted by the access point in the overlapping basic service set, and a power level of the first beacon frame as received by the access point in the overlapping basic service set.

20. The wireless device of claim 18, wherein the extended restricted wake time metric information is based on:

a power level of the first beacon frame as transmitted by the access point in the basic service set, a margin, an acceptable interference level for the access point in the basic service set, and a power level of the first beacon frame as received by the access point in the overlapping basic service set.

* * * * *